US012583226B2

(12) United States Patent
Takekoshi et al.

(10) Patent No.: US 12,583,226 B2
(45) Date of Patent: Mar. 24, 2026

(54) PRINTING APPARATUS INCLUDING AN APPLICATION UNIT THAT APPLIES AN AMOUNT OF WIPING LIQUID BASED ON AN ADHESION AMOUNT OF INK

(71) Applicant: CANON KABUSHIKI KAISHA, Tokyo (JP)

(72) Inventors: Rie Takekoshi, Kanagawa (JP); Toshimitsu Danzuka, Tokyo (JP); Akihiro Tomida, Kanagawa (JP); Keita Ishimi, Kanagawa (JP); Akiko Aichi, Tokyo (JP); Hiroto Kango, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 167 days.

(21) Appl. No.: 18/535,252

(22) Filed: Dec. 11, 2023

(65) Prior Publication Data

US 2024/0198682 A1 Jun. 20, 2024

(30) Foreign Application Priority Data

Dec. 16, 2022 (JP) ................................. 2022-201444

(51) Int. Cl.
*B41J 2/165* (2006.01)
*B41J 29/17* (2006.01)

(52) U.S. Cl.
CPC ........... *B41J 2/16552* (2013.01); *B41J 29/17* (2013.01); *B41J 2002/16558* (2013.01); *B41P 2235/20* (2013.01)

(58) Field of Classification Search
CPC .................... B41J 2/16552; B41J 29/17; B41J 2002/16558; B41J 2/16535; B41J 2/16538; B41J 2002/1655; B41P 2235/20
(Continued)

(56) References Cited

U.S. PATENT DOCUMENTS 7,287,825 B2 10/2007 Furuichi et al. ......... B41J 2/165
7,290,858 B2 11/2007 Furuichi et al. ......... B41J 2/205
(Continued)

OTHER PUBLICATIONS

U.S. Appl. No. 18/535,834, filed Dec. 11, 2023, Printing Apparatus and Control Method Gau, Keita Ishimi, Toshimitsu Danzuka, Rie Takekoshi, Takao Ogata, Akihiro Tomida, Akiko Aichi.
(Continued)

*Primary Examiner* — Jason S Uhlenhake
*Assistant Examiner* — Alexander D Shenderov
(74) *Attorney, Agent, or Firm* — Venable LLP

(57) ABSTRACT

A printing apparatus includes a printing unit with an ejection port surface, on which is formed an ejection port array with a plurality of ejection ports that ejects ink, a wiping unit with a wiping member for wiping a predetermined area including the ejection port array, and to wipe the predetermined area by relative movement with the printing unit, an application unit to apply a wiping liquid for re-dispersing the ink, and a control unit to control the application unit to apply the wiping liquid to a wiping area, according to an amount of ink adhering to the wiping member. The application unit applies a first amount of the wiping liquid to the wiping area when the adhesion amount is a first amount, and applies a second amount, less than the first, to the wiping area when the adhesion amount is a second adhesion amount, less than the first.

15 Claims, 21 Drawing Sheets

(58) Field of Classification Search
USPC .......................................................... 347/23
See application file for complete search history.

(56) References Cited

U.S. PATENT DOCUMENTS

| | | | | |
|---|---|---|---|---|
| 8,342,638 | B2 | 1/2013 | Sole Pons et al. | B41J 2/165 |
| 8,882,232 | B2 | 11/2014 | Ibe et al. | B41J 29/393 |
| 9,114,651 | B2 | 8/2015 | Kato et al. | B41J 29/393 |
| 9,162,462 | B2 | 10/2015 | Komatsu et al. | B41J 2/165 |
| 9,561,658 | B2 | 2/2017 | Danzuka et al. | B41J 29/393 |
| 9,707,763 | B2 | 7/2017 | Nakagawa et al. | B41J 2/165 |
| 9,862,195 | B2 | 1/2018 | Genta et al. | B41J 2/165 |
| 11,247,471 | B2 | 2/2022 | Narumi et al. | B41J 2/165 |
| 2014/0368577 | A1 | 12/2014 | Ibe et al. | B41J 2/165 |
| 2019/0270309 | A1 * | 9/2019 | Nakagawa | B41J 2/16538 |
| 2022/0305792 | A1 | 9/2022 | Ishii et al. | B41J 2/165 |
| 2022/0324233 | A1 | 10/2022 | Uetsuki et al. | B41J 2/165 |
| 2022/0388321 | A1 | 12/2022 | Takekoshi et al. | B41J 25/00 |
| 2024/0001678 | A1 | 1/2024 | Tomida et al. | B41J 2/165 |
| 2024/0010002 | A1 | 1/2024 | Takekoshi et al. | B41J 2/175 |

OTHER PUBLICATIONS

U.S. Appl. No. 18/399,572, filed Dec. 28, 2023, Liquid Discharge Apparatus and Control Method Gau, Akihiro Tomida, Toshimitsu Danzuka, Keita Ishimi, Takao Ogata, Rie Takekoshi, Akiko Aichi.
U.S. Appl. No. 18/512,995, filed Nov. 17, 2023.
U.S. Appl. No. 18/513,078, filed Nov. 17, 2023.
U.S. Appl. No. 18/535,834, filed Dec. 11, 2023.
U.S. Appl. No. 18/399,572, filed Dec. 28, 2023.

* cited by examiner

PRINTING APPARATUS INCLUDING AN APPLICATION UNIT THAT APPLIES AN AMOUNT OF WIPING LIQUID BASED ON AN ADHESION AMOUNT OF INK

BACKGROUND OF THE INVENTION

This application claims the benefit of Japanese Patent Application No. 2022-201444, filed Dec. 16, 2022, which is hereby incorporated by reference herein in its entirety.

FIELD OF THE INVENTION

The present invention relates to a printing apparatus that performs printing by ejecting liquid.

DESCRIPTION OF THE RELATED ART

The specification of U.S. Pat. No. 8,342,638 discloses a technology for removing deposits, such as ink adhering to an ejection port surface of a print head in which ejection ports for ejecting ink are formed. Specifically, in the technology disclosed in the specification of U.S. Pat. No. 8,342,638, a sheet-shaped cleaning member is pressed against the ejection port surface to wipe off and to remove the deposits adhering to the ejection port surface.

By the way, the amount of ink that adheres to the ejection port surface changes depending on various situations such as the number of times of ejections performed by the print head. However, in the specification of U.S. Pat. No. 8,342,638, regardless of such situations, the wiping member is wound up by a fixed amount each time a wiping operation is performed, so as to supply a new wiping area for the next wiping operation. For this reason, the wiping member, which is a consumable, cannot be used efficiently, and thus, there have been cases of insufficient wiping, an unnecessary increase in the cost, and the like.

SUMMARY OF THE INVENTION

The present invention has been made in view of the above-described problems, and provides a technology capable of efficiently using a wiping member.

In the first aspect of the present invention, a printing apparatus includes a printing unit configured with an ejection port surface on which an ejection port array with a plurality of ejection ports that ejects ink being arranged in an array is formed, a wiping unit configured with a wiping member for wiping a predetermined area including the ejection port array of the ejection port surface, and configured to wipe the predetermined area by relative movement with the printing unit, an application unit configured to apply a wiping liquid for re-dispersing the ink, and a control unit configured to control the application unit to apply the wiping liquid to a wiping area that wipes the predetermined area, according to an adhesion amount of ink adhering to the wiping member.

In the second aspect of the present invention, a printing apparatus includes a printing unit configured with an ejection port surface on which an ejection port array with a plurality of ejection ports that ejects ink being arranged in an array is formed, a wiping unit configured with a wiping member for wiping a predetermined area including the ejection port array of the ejection port surface, and configured to wipe the predetermined area by relative movement with the printing unit, and a control unit configured to control a process executed for the wiping member according to an adhesion amount of ink adhering to an area including the ejection port array and a vicinity of the ejection port array.

In the third aspect of the present invention, a printing apparatus includes a printing unit configured with an ejection port surface on which an ejection port array with a plurality of ejection ports that ejects ink being arranged in an array is formed, a wiping unit configured with a wiping member for wiping a predetermined area including the ejection port array of the ejection port surface, and configured to wipe the predetermined area by relative movement with the printing unit, and a control unit configured to control a process executed for the wiping member according to a duty or the number of times of ejections based on print data for the ink.

According to the present invention, a wiping member can be used efficiently.

Further features of the present invention will become apparent from the following description of exemplary embodiments with reference to the attached drawings.

DESCRIPTION OF THE EMBODIMENTS

Hereafter, with reference to the accompanying drawings, a detailed explanation is given of an example of embodiments of a printing apparatus. Note that the following embodiments are not intended to limit the present invention, and each combination of the characteristics explained in the present embodiments is not necessarily essential to the solution provided in the present invention. Further, the positions, shapes, etc., of the constituent elements described in the embodiments are merely examples and are not intended to limit the range of this invention to that of the examples.

In the present specification, "printing" not only indicates cases of forming meaningful information such as characters and figures. That is, being meaningful or meaningless does not matter. Further, for "printing", whether or not being elicited in such a manner that a human can visually perceive does not matter, and cases of forming an image, design, pattern, or the like, on a print medium in a broad sense or cases of processing a medium are also indicated. Further, "print medium" represents not only paper used in a general printing apparatus but also a material that can accept ink in a broad sense, such as a cloth, plastic film, metal plate, glass, ceramics, wood, leather, and the like. Furthermore, "ink" (also referred to as "liquid" in the present specification) should be interpreted in a broad sense as with the above-described definition of "printing". Therefore, "ink" indicates liquids that are applied onto a print medium, thereby serving for forming an image, design, pattern, etc., for processing a print medium, or for treating an ink (e.g., solidification or insolubilization of a coloring material in an ink applied to a print medium). In addition, unless otherwise specified, "nozzle" collectively indicates an ejection port, a flow path communicating therewith, and an element that generates energy utilized for ink ejection.

First Embodiment

First, with reference to FIG. 1 through FIG. 13, an explanation is given of the printing apparatus according to the first embodiment. The printing apparatus explained in the present specification is what is termed as an inkjet printing apparatus of a serial scan type, which ejects ink to a conveyed print medium in an inkjet system while moving in a direction intersecting (orthogonally in the present embodiment) the conveyance direction. Note that, in the present specification, directions are indicated using the X direction, the Y direction, and the Z direction that are orthogonal to each other. Each direction is from one side toward the other side.

<Configuration of the Printing Apparatus>

Figure 1:
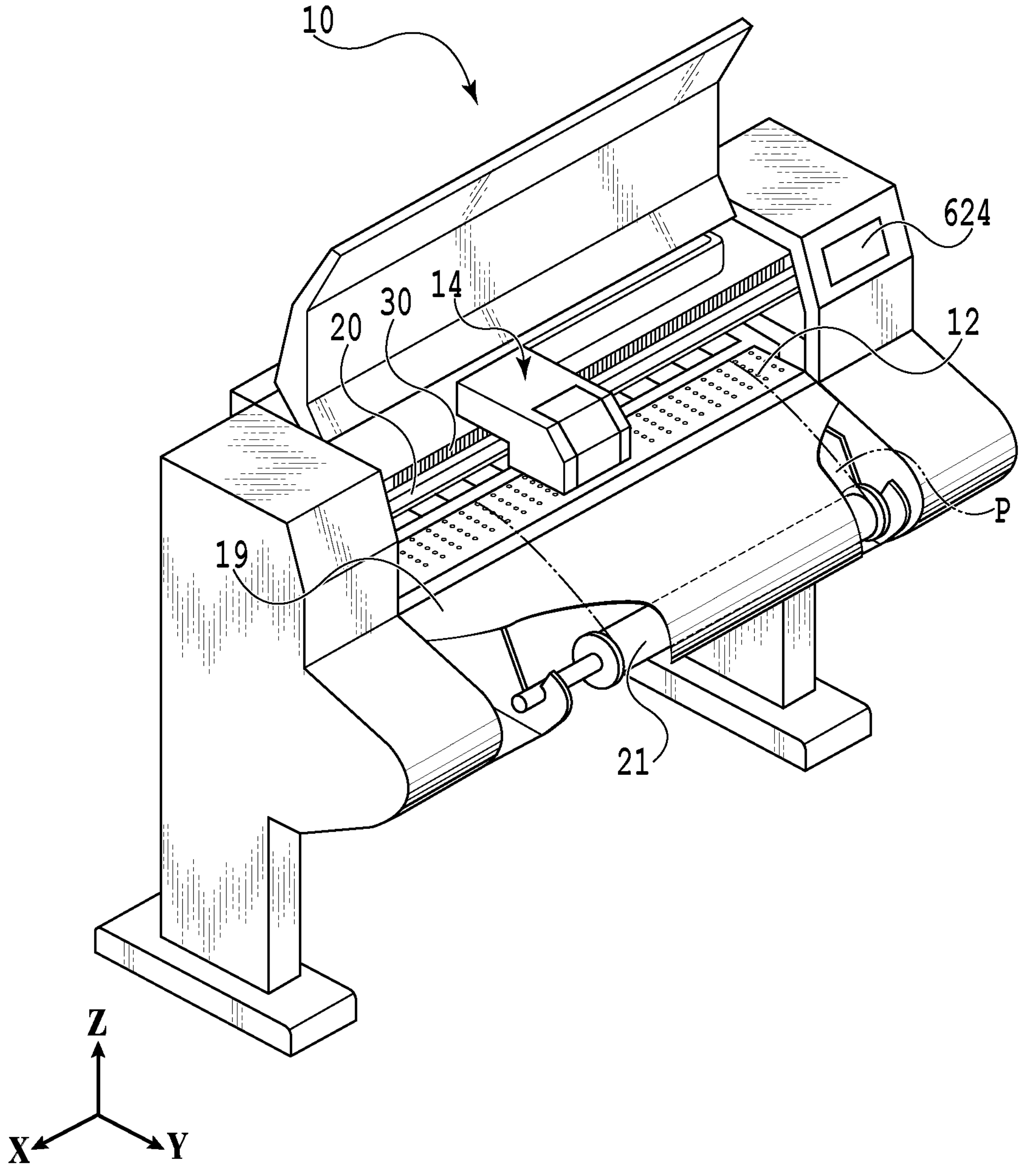
FIG. 1 is a perspective configuration diagram of a printing apparatus.
Figure 2A:
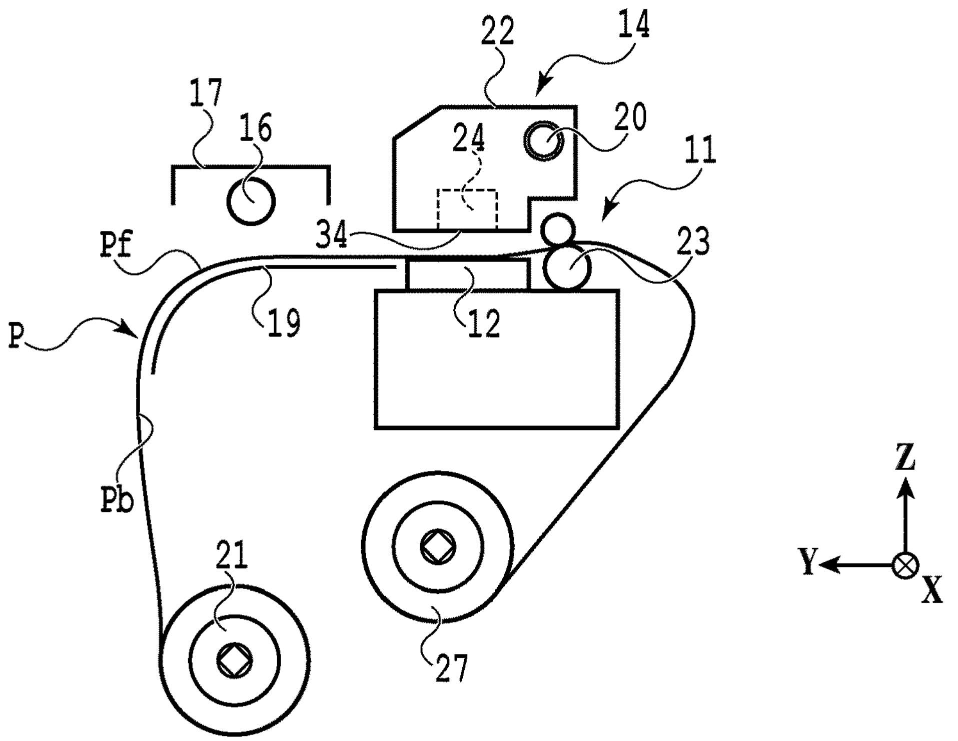
FIG. 2A and FIG. 2B are schematic configuration diagrams of the main configurations of the printing apparatus.
Figure 2B:
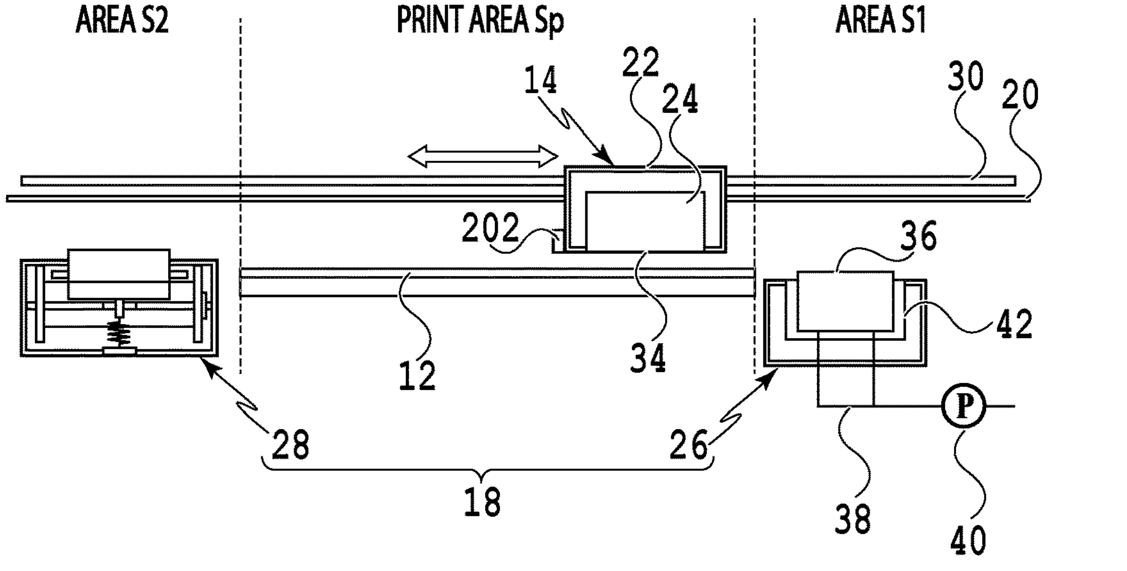

FIG. 1 is a schematic configuration diagram of the printing apparatus. FIG. 2A is a diagram for explaining a heating part in the printing apparatus, and FIG. 2B is a diagram for explaining a recovery part in the printing apparatus.

The printing apparatus 10 is equipped with the platen 12, which supports the print medium P conveyed by the conveyance part 11 (see FIG. 2A), and the printing part 14, which performs printing on the print medium P that is supported by the platen 12. Further, the printing apparatus 10 is equipped with the heating part 16 (see FIG. 2A), which heats the printing surface Pf of the print medium P after printing, and the recovery part 18 (see FIG. 2B), which is for favorably maintaining and recovering the ink ejection performance of the printing part 14. Note that the entire operation of the printing apparatus 10 is controlled by the control part 600 (which is described hereafter).

The conveyance part 11 conveys the sheet-shaped print medium P that is unwound and fed from the roll paper 27 with the conveyance roller 23, which is driven by a conveyance motor (not illustrated in the drawings) via gears, to the platen 12. The print medium P after printing is wound up by the spool 21. Note that the conveyance mechanism of the conveyance part 11 is not limited as such, and various publicly-known technologies can be used.

The printing part 14 is equipped with the carriage 22, which is installed on the guide shaft 20 in a movable manner, and the print head 24 (see FIG. 2A), that is configured to be detachably attachable to the carriage 22 to eject ink to the print medium P that is supported by the platen 12. The guide shaft 20 extends in the X direction which intersects (orthogonally, in the present embodiment) the Y direction in which the print medium P is conveyed, and the carriage 22 is configured to be movable in the X direction in a reciprocating manner along the guide shaft 20. The print head 24 is equipped with the multiple ejection port arrays 302 (described hereafter) formed by arranging multiple ejection ports for ejecting ink along the Y direction, and is mounted on the carriage 22 so that the ejection port surface 34 (see FIG. 2A) on which the ejection port arrays 302 are formed faces the platen 12. Accordingly, in the printing apparatus 10, the print head 24 is configured to be capable of ejecting ink while reciprocating in the X direction. As for the specific movement mechanisms of the carriage 22, various publicly-known technologies such as a mechanism using a carriage belt or a lead screw for transmitting a driving force from a carriage motor can be used.

In the printing apparatus 10, the scale 30 on which slits are formed at equal intervals in the X direction extends in the X direction, and the carriage 22 is equipped with a linear encoder (not illustrated in the drawings) for reading this scale 30. The linear encoder outputs a signal based on a result of reading the scale 30 to the control part 600. The control part 600 obtains the position of the print head 24 based on this signal and controls the movement of the print head 24. Further, the print head 24 is configured to eject multiple types of ink. The present embodiment has a configuration in which black (K) ink, cyan (C) ink, magenta (M) ink, and yellow (Y) ink are ejected from the print head 24. Note that the types and number of inks ejected from the print head 24 are not limited to the four inks described above.

In the printing apparatus 10, the printing part 14, i.e., the print head 24, moves at a speed of 40 inches/sec and performs printing at a resolution of 1200 dpi (1 dot per 1/1200 inches), for example. Upon a start of printing, the printing apparatus 10 moves the print head 24 to the printing start position and feeds the print medium P with the conveyance part 11 to a position where printing can be performed by the print head 24. Next, based on print data, a printing operation of ejecting ink while moving (scanning with) the print head 24 in the X direction is performed, and, upon completion of the printing operation, a conveyance operation of conveying the print medium P by a predetermined amount with the conveyance part 11 is performed. Thereafter, the printing operation is performed again. In this way, the printing apparatus 10 performs printing on the print medium P by alternately and repeatedly executing the printing operation and the conveyance operation. Note that, in the present embodiment, it is assumed to execute multipath printing, in which printing is performed by scanning with the printing part 14 multiple times for a unit area on a print medium, for example.

Further, the carriage 22 is equipped with the sensor 202 on one side or the other side in the X direction for detecting the concentration or lightness of ink adhering to an object located at a position that can face the ejection port surface 34 of the print head 24. The sensor 202 is an optical sensor that receives light emitted from a light emitting part toward an object using a light receiving part, and outputs the amount of herein-received light to the control part 600. The control part 600 detects the concentration or lightness of the ink based on this amount of received light. Although details are described hereafter, in the present embodiment, the sensor 202 detects the concentration of ink adhering to the wiping member 502 (described hereafter) in the maintenance part 28 (described hereafter) of the recovery part 18. The sensor 202 is not limited to being installed on the carriage 22. As long as the ink adhering to the wiping member 502 of the maintenance part 28 can be detected, the sensor 202 may be installed with any configuration or at any position and, for example, may be installed separately from the printing apparatus 10.

The heating part 16 irradiates heat to the printing surface Pf of the print medium P on which printing has been performed, in order to heat the printing surface Pf and the ink ejected on the printing surface Pf and fix the ink to the printing surface Pf. The heating part 16 is covered with the cover 17, and the cover 17 has a function of efficiently reflecting the heat of the heating part 16 onto the print medium P and a function of protecting the heating part 16. As the heating part 16, various kinds of heaters such as a sheathed heater and a halogen heater can be used, for example. Not only such a noncontact type heat conduction heater, it is also possible that the heating part 16 is configured to apply heat with warm air. Note that the heating part 16 is configured to fix ink to the print medium P, and thus, depending on the type of ink used, the printing apparatus 10 may be configured without the heating part 16. Further, although illustration in the drawings is omitted, the printing apparatus 10 may be equipped with a cutter part that can cut the print medium P at a predetermined position.

The recovery part 18 is equipped with the suction part 26, which is installed at a position adjacent to one end of the platen 12 in the X direction, and the maintenance part 28, which is installed at a position adjacent to the other end of the platen 12 in the X direction. That is, the suction part 26 is located in the area S1 on the one end side of the print area Sp, in which printing is performed by the print head 24 to the print medium P that is supported by the platen 12. Further, the maintenance part 28 is located in the area S2 on the other end side of the print area Sp. Note that the detailed configuration of the maintenance part 28 is described hereafter.

The suction part 26 has a configuration for performing a suction process to maintain and to recover good ink ejection performance from each ejection port by forcibly suctioning ink from multiple ejection ports constituting each ejection port array 302 in the print head 24. The suction part 26 is equipped with the cap 36 that covers a predetermined area including the ejection port arrays 302 on the ejection port surface 34 of the print head 24.

Specifically, the cap 36 covers the K ink ejection port array, the C ink ejection port array, the M ink ejection port array, and the Y ink ejection port array. Note that the cap 36 may be configured independently for each ink color.

The cap 36 is connected to the pump 40 via the tube 38. With the cap 36 abutting on the ejection port surface 34 to cover the predetermined area including each ejection port array 302, a negative pressure is generated inside the cap 36 by the pump 40 connected to the cap 36, so that the negative pressure forcibly suctions the ink from each ejection port. The cap 36 is configured to be movable in the Z direction by the raising/lowering part 42. The cap 36 is raised by the raising/lowering part 42 to be made to abut on the ejection port surface 34 and cover the predetermined area, and is lowered by the raising/lowering part 42 to be made to separate from the ejection port surface 34 and release the predetermined area.

<Configuration of the Print Head>

Figure 3:
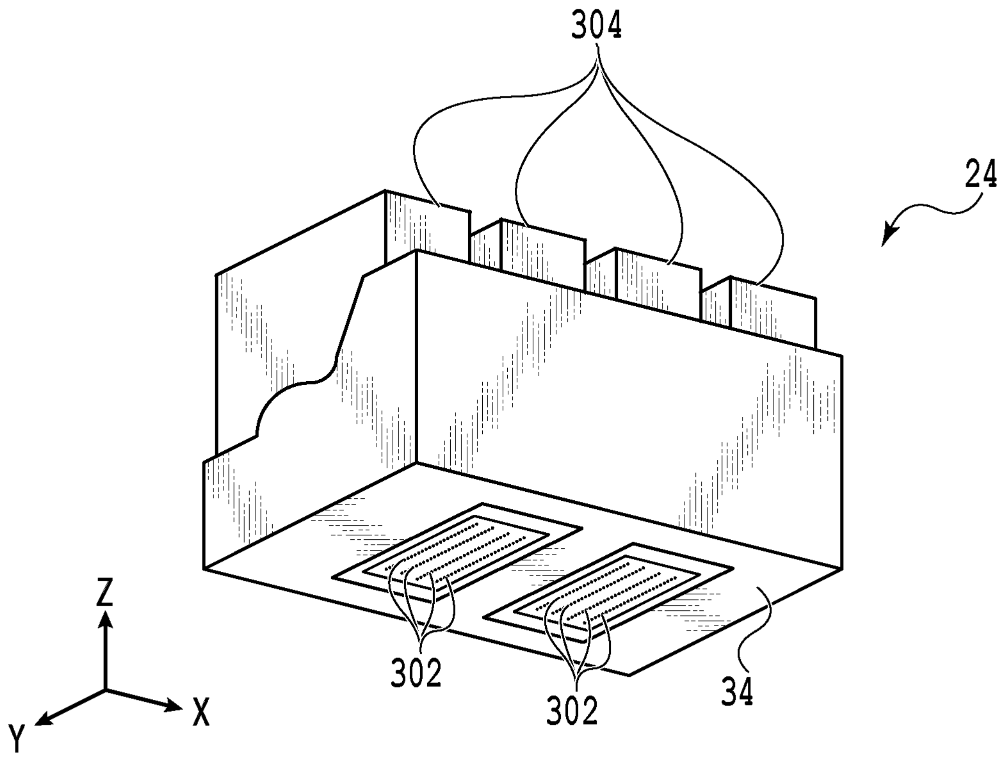
FIG. 3 is a perspective configuration diagram of a print head.

Next, an explanation is given of the configuration of the print head 24. FIG. 3 is a schematic configuration diagram of the print head 24. On the ejection port surface 34 of the print head 24, the ejection port arrays 302 formed of multiple ejection ports for ejecting the corresponding ink are formed for the respective ink colors. The ejection port arrays 302 extend in the Y direction, and the ejection port arrays 302 corresponding to the respective colors of ink are arranged side by side along the X direction.

In the present embodiment, the ejection port arrays 302 have 1280 ejection ports arranged along the Y direction at a density of 1200 dpi. The amount of ink droplet ejected at one time from each ejection port is approximately 4.5 pl. In an area of the ejection port surface 34 including the ejection port arrays 302, for example, in an area including at least a predetermined area to be covered by the cap 36, a water-repellent film which repels ink, i.e., which has water repellency, is formed to prevent ink droplets from adhering to each ejection port. This water-repellent film prevents ink droplets from adhering to the ejection ports, thereby maintaining stable ejection performance from each ejection port. The contact angle of the ink on the water-repellent film is, for example, 80 degrees or more and 100 degrees or less. The contact angle refers to a contact angle (dynamic receding contact angle) of an ink droplet on the water-repellent film. In the present embodiment, water repellency indicates that a water droplet (ink droplet) that has come into contact does not wet or spread on the contact portion. Whether the water repellency is high or low can be determined by measuring the contact angle (dynamic receding contact angle) of an ink droplet in contact with the surface of the member.

To each ejection port, ink is supplied via an ink flow path (not illustrated in the drawings) inside the print head 24 from the joint part 304, which is connected to an ink tank (not illustrated in the drawings) storing the corresponding ink via a supply tube (not illustrated in the drawings). The print head 24 is a thermal inkjet print head that ejects ink using thermal energy, and is equipped with multiple electrothermal converter for generating thermal energy. That is, the print head 24 generates thermal energy based on a pulse signal applied to an electrothermal converter, causes film boiling of the ink in an ink bubbling chamber (not illustrated in the drawings) with this thermal energy, and ejects ink from an ejection port using the foaming pressure of the film boiling. Note that the ink ejection method is not limited as such, and other publicly-known methods such as a method using a piezoelectric element may be used.

Although the configuration in which the carriage 22 is equipped with one print head 24 is explained as an example in the present embodiment, such a configuration in which the carriage 22 is equipped with multiple print heads 24 is also possible. Further, ink is supplied to the print head 24 via a supply tube from an ink tank mounted in the main body or on an external unit. Ink is supplied from the ink tank to the print head 24 using a pressurizing unit. Alternatively, ink may be supplied from the ink tank to the print head 24 by suctioning, which is performed by capping the ejection port surface 34 of the print head 24 with the cap 36 and applying negative pressure in the cap 36 with the pump 40.

<Maintenance Part>

Figure 4:
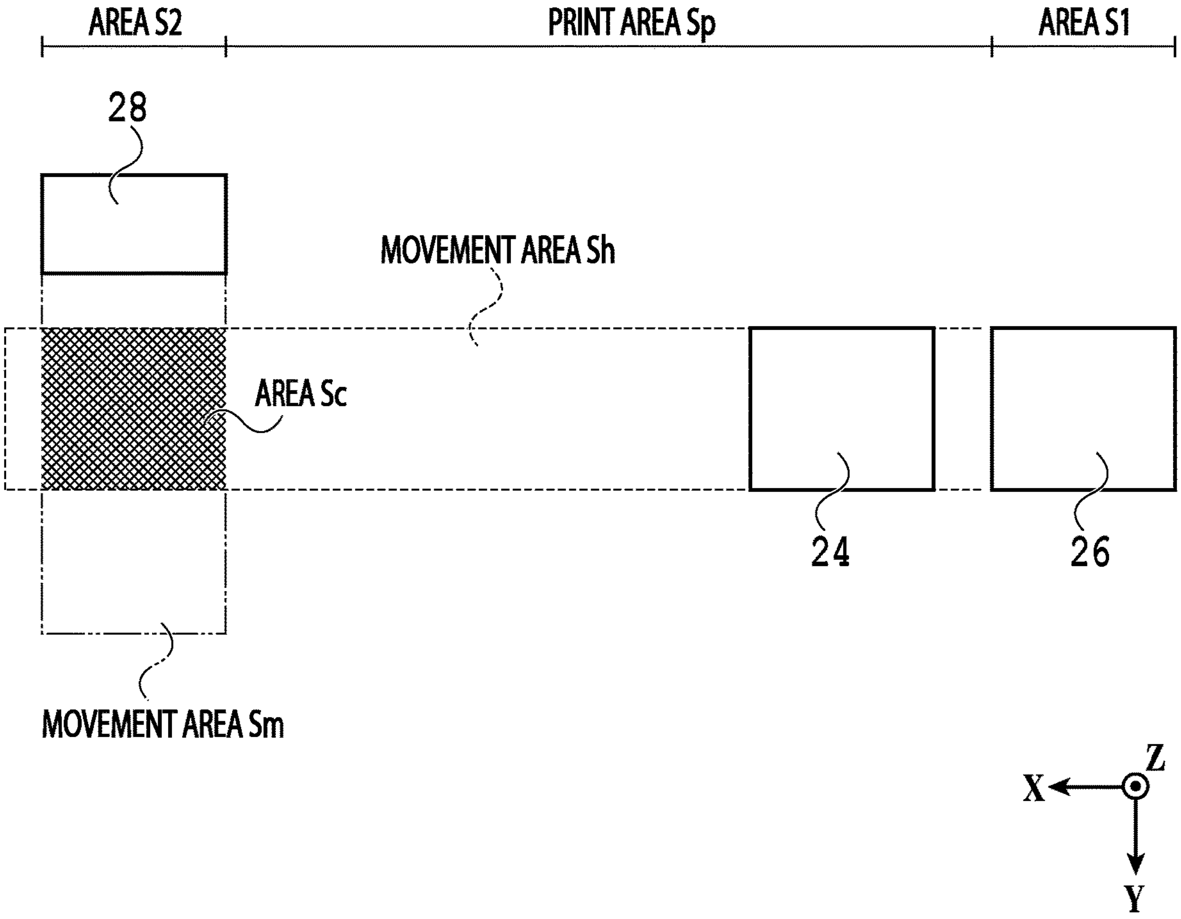
FIG. 4 is a diagram illustrating the movement areas of the print head and a maintenance part.
Figure 5A:
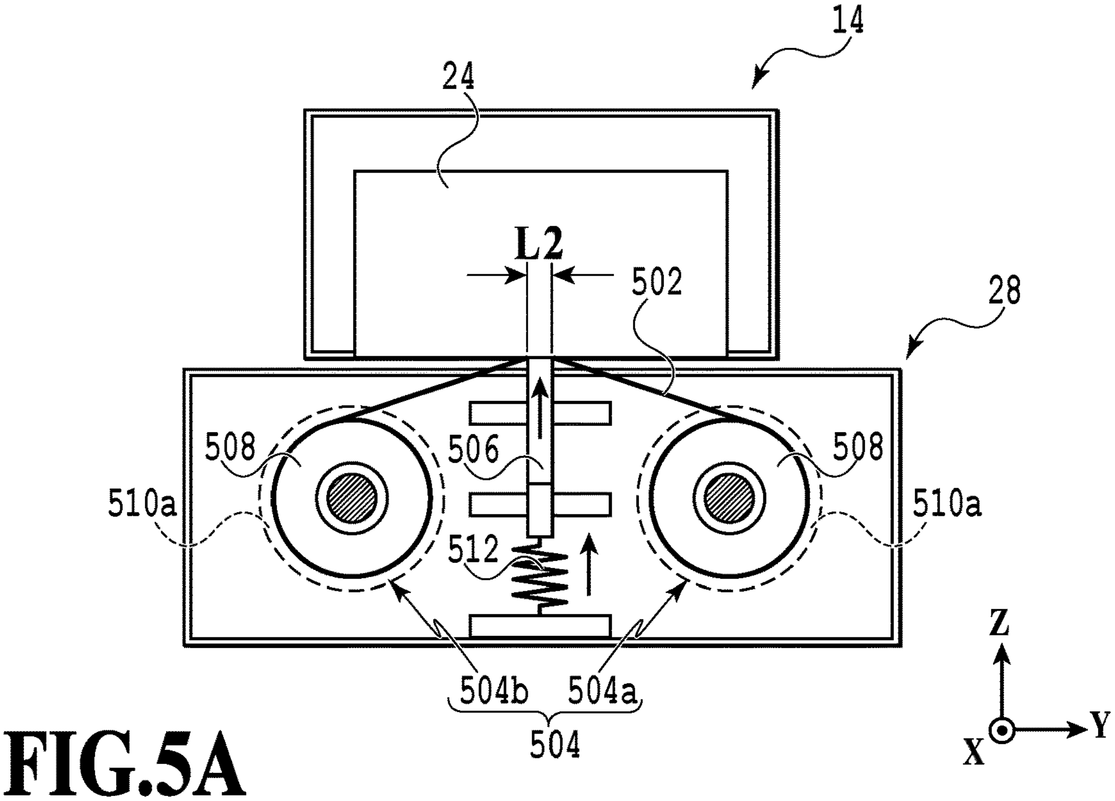
FIG. 5A and FIG. 5B are schematic configuration diagrams of the maintenance part.
Figure 5B:
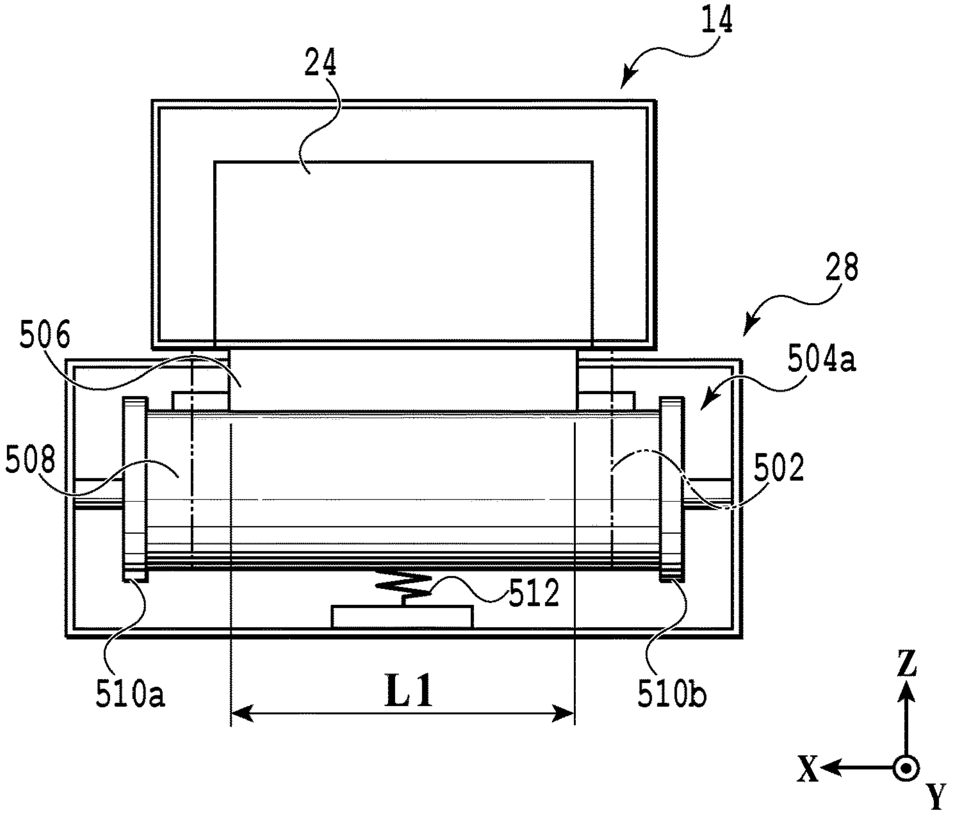

Next, an explanation is given of the maintenance part 28 in the recovery part 18. FIG. 4 is a diagram illustrating the movement area Sm of the maintenance part 28 and the movement area Sh of the print head 24. FIG. 5A and FIG. 5B are schematic configuration diagrams of the maintenance part 28. FIG. 5A is a side view diagram seen from the other side in the X direction, and FIG. 5B is a front view diagram. Note that, in FIG. 5A and FIG. 5B, in order to facilitate understanding, a side wall portion is cut away so that the internal structures can be seen, and some of the structures are indicated with broken lines.

The maintenance part 28 is installed in the area S2 on the other end side of the print area Sp so as to be movable in the Y direction. As illustrated in FIG. 4, the movement area Sm of the maintenance part 28 partially overlaps the movement area Sh of the print head 24, which moves in the X direction. The maintenance part 28 is capable of performing reciprocal movement between the first position, which is located on the other side in the Y direction with respect to the movement area Sh of the print head 24, and the second position, which is located on one side in the Y direction with respect to the movement area Sh.

At the time of not executing the wiping operation, the maintenance part 28 is located at the standby position, which is, for example, within the movement area Sm of the maintenance part 28 not overlapping the movement area Sh of the print head 24. Further, at the time of executing the wiping operation, the maintenance part 28 moves from the wiping start position toward the wiping end position in a state where the print head 24 is located at the wiping position within the area Sc where the movement area Sm and the movement area Sh overlap. Note that the wiping start position is a position where the maintenance part 28 starts wiping, and is set on the first position side so as not to overlap the area Sc. The wiping end position is a position where the maintenance part 28 ends wiping, and is set on the second position side so as not to overlap the area Sc.

The maintenance part 28 is equipped with the sheet-shaped wiping member 502 that receives ink during wiping and abuts on the ejection port surface 34 to wipe off ink, and the like, that has adhered to the ejection port surface 34 (see FIG. 5A). Further, the maintenance part 28 is equipped with the winding part 504, which winds up the wiping member 502, and the pressing member 506, which presses the wiping member 502 to make the wiping member 502 abut on the ejection port surface 34 at a predetermined pressure.

As the wiping member 502, a porous material is used, for example. A porous material absorbs ink from ejection ports during wiping more easily than an elastic material. Furthermore, the wiping member 502 may be impregnated in advance with an impregnating liquid containing, for example, a solvent with low volatility such as polyethylene glycol as a main component. For the wiping member 502, a non-woven fabric is used, for example. More specifically, it is preferable to use a sheet web or a pad-like non-woven fabric that is made with fibers bonded or entangled by melt-adhesion or mechanical or chemical action. The wiping member 502 can instantaneously absorb adhering liquid such as ink with capillary pressure created by fine pores of the non-woven fabric. As the non-woven fabric, a non-woven fabric made of short polyester fibers can be used, for example. Further, the wiping member 502 may be a sheet-like knitted fabric or woven fabric made of long fibers, and may be made of a mixture of polyester and nylon, cotton, or the like.

The winding part 504 is equipped with the rotary member 504*a*, around which the wiping member 502 that has been unused is wound, and the rotary member 504*b*, which winds up the wiping member 502 that has been used. The rotary member 504*b* is arranged on one side of Y direction with respect to the rotary member 504*a*. The tip of the wiping member 502 is attached to the rotary member 504*b*, and the rotary member 504*b* winds up the wiping member 502 by rotating under the control of the control part 600.

The driving of the rotary member 504*b* is controlled by the driving of a conveyance motor that drives the conveyance roller 23, via a gear, for example. Accordingly, the wiping member 502 located between the rotary member 504*a* and the rotary member 504*b* is conveyed in the opposite direction of the conveyance direction of the print medium P. Note that the conveyance amount of the wiping member 502 is not limited to being controlled by the driving amount of the conveyance motor. For example, it is also possible to install a configuration that can measure the conveyance amount of the wiping member 502, so that the conveyance amount is controlled based on the measurement results of the configuration. The rotary members 504*a* and 504*b* are equipped with the pairs of disk members 510*a* and 510*b* installed at both ends of the X direction of the core parts 508 around which the wiping member 502 is wound. The diameter of the disk members 510*a* and 510*b* are larger than the diameter of the core parts 508.

In the maintenance part 28, the wiping member 502 which is located across the rotary member 504*a* and the rotary member 504*b* is exposed in a view from above. The size of the exposed wiping member 502 is a size capable of abutting on a predetermined area including each ejection port array 302 of the ejection port surface 34 of the print head 24 located at the wiping position while the maintenance part 28 moves in the movement area Sm in a state being pressed by the pressing member 506.

Between the rotary member 504*a* and the rotary member 504*b*, the pressing member 506 presses the wiping member 502, which is located across the rotary member 504*a* and the rotary member 504*b*, toward the other side in the Z direction, i.e., toward the upper side, by the biasing force of the biasing member 512. The length L1 of the pressing member 506 in the X direction corresponds to the predetermined area of the ejection port surface 34 of the print head 24 located at the wiping position. Note that the length in the X direction across which the wiping member 502 is pressed by the pressing member 506 may be longer than the length corresponding to the predetermined area. For example, a length that can cover the entire ejection port surface 34 of the print head 24 is possible. In this case, it is possible to wipe the entire ejection port surface 34 by the correspondence of the length of the wiping member 502 in the X direction, and thus, if the predetermined area is capped with the cap 36, a gap is less likely to be formed between the cap 36 and the ejection port surface 34. For example, the length L2 of the pressing member 506 in the Y direction may be about 5 mm. This is a length that allows the wiping member 502 pressed by the pressing member 506 to abut on approximately 240 ejection ports at once in the ejection port arrays 302.

Further, the maintenance part 28 is equipped with a lowering part (not illustrated in the drawings), which lowers the pressing member 506. This lowering part lowers the pressing member 506 against the biasing force of the biasing member 512 under the control of the control part 600. Accordingly, the maintenance part 28 can be moved within the movement area Sm without making the wiping member 502 abut on the ejection port surface 34. Note that, although the maintenance part 28 is moved relative to the print head 24 located at the wiping position to wipe the ejection port surface 34 in the present embodiment, there is not a limitation as such. It is also possible that the maintenance part 28 is fixed and the ejection port surface 34 is wiped by moving the print head 24, or that the ejection port surface 34 is wiped by moving both the print head 24 and the maintenance part 28. That is, any configuration is possible as long as the printing apparatus 10 wipes the ejection port surface 34 by relative movement of the print head 24 and the maintenance part 28.

<Configuration of the Control System of the Printing Apparatus>

Figure 6:
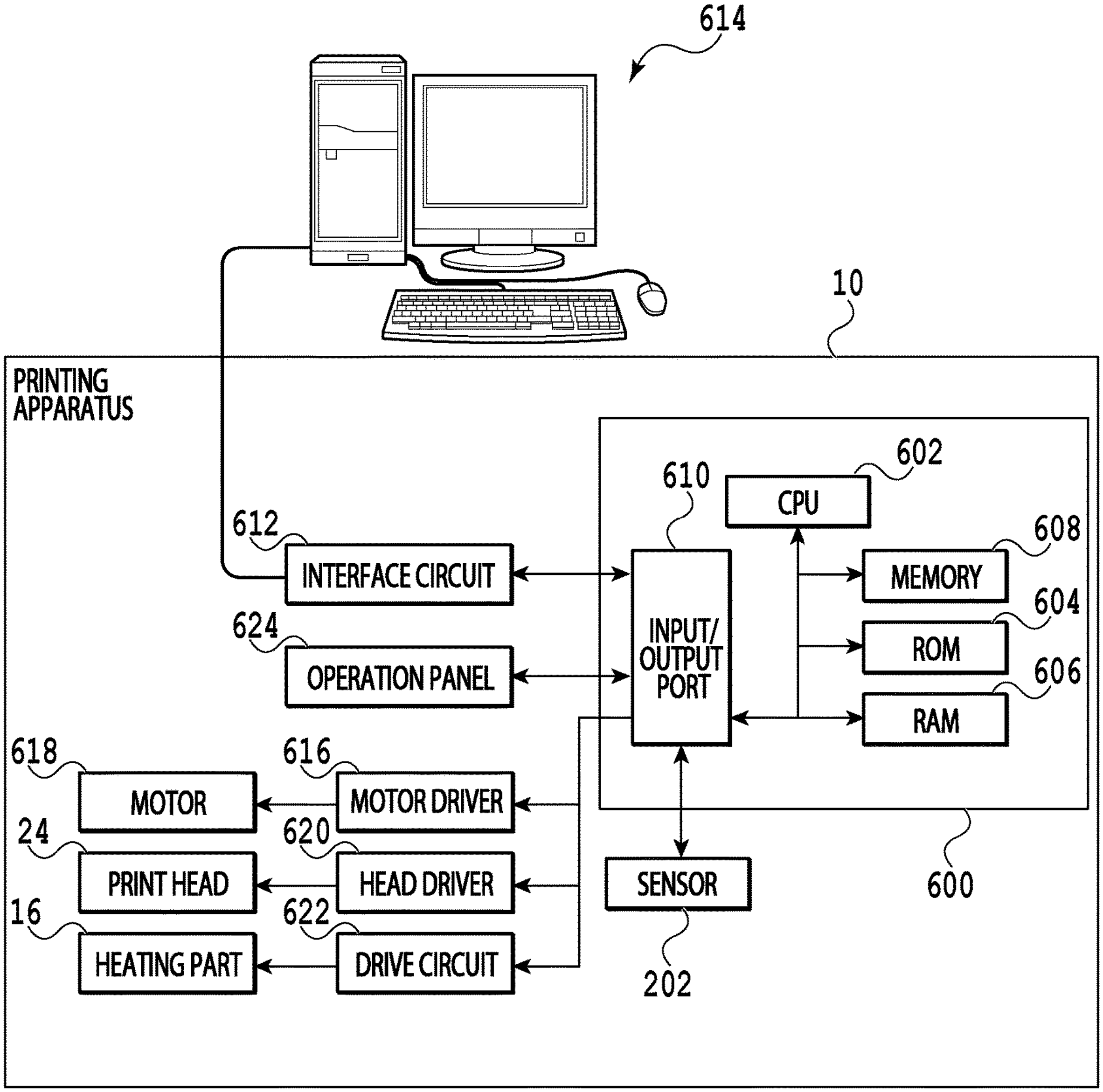
FIG. 6 is a block diagram illustrating a configuration of a control system of the printing apparatus.

Next, an explanation is given of the configuration of the control system of the printing apparatus 10. FIG. 6 is a block diagram illustrating the configuration of the control system of the printing apparatus 10.

The control part 600 that controls the entire printing apparatus 10 is equipped with the central processing unit (CPU) 602, the ROM 604, the RAM 606, and the memory 608. The CPU 602 controls the operation of each constituent member in the printing apparatus 10, processes input image data, or the like, based on various programs. The ROM 604 functions as a memory for performing various kinds of control executed by the CPU 602 and for storing processing programs for image data. The RAM 606 is a memory that temporarily stores various kinds of data used to control the printing apparatus 10, and serves as a work area used by the CPU 602 for executing various processes. The memory 608 stores data such as the later-described mask patterns and threshold values used in the later-described wiping process. Further, the control part 600 is equipped with the input/output port 610, and is connected to various drivers, drive circuits, etc., via this input/output port 610.

The control part 600 is connected via the input/output port to the interface circuit 612, and is connected to the host apparatus 614 via this interface circuit 612. Further, the control part 600 is connected via the input/output port 610 to the operation panel 624 that can be operated by the user. The user inputs image data, or the like, to the printing apparatus 10 via the host apparatus 614, and also inputs various kinds of information to the printing apparatus 10 via the host apparatus 614 and the operation panel 624. Further, the control part 600 is connected to the motor driver 616 via the input/output port 610, so as to control the driving of the motor 618 via this motor driver 616. Note that, in FIG. 6, various motors in the printing apparatus 10, such as a motor for moving the carriage 22, a motor for conveying the print medium P, a motor for moving the maintenance part 28, and a motor for driving the winding part 504, are collectively illustrated as the motor 618.

The control part 600 is connected to the head driver 620 via the input/output port 610, so as to control the print head 24 via the head driver 620 to eject ink. Further, the control part 600 is connected to the drive circuit 622 via the input/output port 610, so as to control the driving of the heating part 16 via the drive circuit 622. Furthermore, the control part 600 is connected to the sensor 202 via the input/output port 610, so as to control the driving of the sensor 202 and to receive detection results from the sensor 202. In this way, in the present embodiment, the control part 600 functions as an obtaining part that obtains information related to the ink to be wiped off by the maintenance part 28.

In the control part 600, the CPU 602 converts image data that is input from the host apparatus 614 into print data, and stores the print data in the RAM 606. Specifically, if the CPU 602 obtains image data represented by the information of RGB each of which is 8-bit 256 values (0 to 255), this image data is converted into multi-valued data that is represented by multiple types of ink used in printing (which are K, C, M, and Y in the present embodiment). By this color conversion process, multi-valued data represented by the information of 8-bit 256 values (0 to 255), which defines the tone of each K, C, M, or Y ink in each pixel group consisting of multiple pixels, is generated.

Next, the multi-valued data represented as K, C, M, and Y is quantized, so as to generate quantization data (binary data) represented by 1-bit binary information (0, 1), which defines ejection or non-ejection of each K, C, M, or Y ink for each pixel. As this quantization process, various publicly-known quantization methods such as an error diffusion method, a dither method, and an index method can be used. Thereafter, a distribution process is performed for distributing the quantization data for multiple times of scanning to be performed by the print head 24 on unit areas. This distribution process generates the print data represented by 1-bit binary information (0, 1) that defines ejection or non-ejection of each K, C, M, or Y ink for each pixel in each of the multiple times of scanning performed on unit areas of a print medium. This distribution process corresponds to multiple times of scanning and is executed using a mask pattern that defines allowance or no allowance of ink ejection for each pixel. Note that generation of such print data is not limited to that executed by the control part 600. That is, the generation may be executed by the host apparatus 614, and it is also possible that a part of the process is performed by the host apparatus 614 and the remaining process is executed by the control part 600.

<Ink Composition>

Next, an explanation is given of the inks used in the present embodiment. Hereinafter, unless otherwise specified, "parts" and "%" are mass scales.

=Black Ink=

(1) Preparation of Pigment Dispersion Liquid

First, an anionic polymer P-1 [styrene/butyl-acrylate/acrylic-acid copolymer (polymerization ratio (weight ratio) =30/40/30), acid value 202, weight average molecular weight 6500] was prepared. This anionic polymer P-1 was neutralized with a potassium hydroxide aqueous solution and diluted with deionized water to prepare a homogeneous 10 mass % polymer aqueous solution. Here, 100 g of the above-described polymer aqueous solution, 100 g of carbon black, and 300 g of deionized water were mixed and mechanically stirred for 0.5 hours. Next, this mixture was processed by passing the mixture five times into an interaction chamber under a liquid pressure of about 70 MPa using a micro-fluidizer. Furthermore, by performing a centrifuge separation process (12,000 rpm, for 20 minutes) to the dispersion liquid obtained as described above, non-dispersed materials including coarse particles were removed, so that a black dispersion liquid was obtained. The obtained black dispersion liquid had a pigment concentration of 10 mass % and a dispersant concentration of 6 mass %.

(2) Preparation of Resin Fine Particle Dispersion Liquid

First, under a nitrogen atmosphere, the following three additive liquids were added little by little by dropping while stirring with a motor in a state heated to 70° C., and polymerization was carried out for 5 hours. The additive liquids were a hydrophobic monomer consisting of 28.5 parts of methyl methacrylate, a mixed liquid including a hydrophilic monomer consisting of 4.3 parts of p-styrene-sulfonic acid sodium and 30 parts of water, and a mixed liquid including a polymerization initiator consisting of 0.05 parts of potassium persulfate and 30 parts of water.

(3) Preparation of Ink

The above-described black dispersion liquid and the above-described resin fine particle dispersion liquid were used to prepare the ink. The following components were added to these to obtain a predetermined concentration, and, after sufficiently mixing and stirring these components, the mixture was filtered under pressure using a microfilter with a pore size of 2.5 μm (manufactured by Fuji Film Corporation), so as to prepare a pigment ink with a pigment concentration of 5 mass % and a dispersant concentration of 3 mass %.

The above-described black dispersion liquid: 50 parts
The above-described resin fine particle dispersion liquid: 10 parts
Zonyl FSO-100 (fluorinated surfactant manufactured by DuPont): 0.05 parts
2-methyl 1,3 propanediol: 15 parts
2-Pyrrolidone: 5 parts
Acetylene glycol EO adduct: 0.5 parts
Deionized water (manufactured by Kawaken Fine Chemicals Co., Ltd.): the rest =Cyan Ink=

(1) Preparation of Dispersion Liquid

First, using benzyl acrylate and methacrylic acid as raw materials, an AB-type block polymer with an acid value of 250 and a number average molecular weight of 3000 was made by a conventional method, and then neutralized with a potassium hydroxide aqueous solution and diluted with deionized water, so that a homogeneous 50 mass % polymer aqueous solution was prepared. 180 g of the above-described polymer solution, 100 g of C.I. Pigment Blue 15:3, and 220 g of deionized water were mixed and stirred mechanically for 0.5 hours. Next, this mixture was processed by passing the mixture five times into an interaction chamber under a liquid pressure of about 70 MPa using a micro-fluidizer. Furthermore, by performing a centrifuge separation process (12,000 rpm, for 20 minutes) to the dispersion liquid obtained as described above, non-dispersed materials including coarse particles were removed, so that a cyan dispersion liquid was obtained. The obtained cyan dispersion liquid had a pigment concentration of 10 mass % and a dispersant concentration of 10 mass %.

(2) Preparation of Resin Fine Particle Dispersion Liquid

A resin fine particle dispersion liquid was prepared using the same raw materials and preparation method as explained for the above-described black ink.

(3) Preparation of Ink

The above-described cyan dispersion liquid and the above-described resin fine particle dispersion liquid were used to prepare the ink. The following ingredients were added to these to obtain a predetermined concentration. Furthermore, after sufficiently mixing and stirring these components, the mixture was filtered under pressure using a microfilter with a pore size of 2.5 μm (manufactured by Fuji Film Corporation), so as to prepare a pigment ink with a pigment concentration of 2 mass % and a dispersant concentration of 2 mass %.

The above-described cyan dispersion liquid: 20 parts
The above-described resin fine particle dispersion liquid: 10 parts
Zonyl FSO-100 (fluorinated surfactant manufactured by DuPont): 0.05 parts
2-methyl 1,3 propanediol: 15 parts
2-Pyrrolidone: 5 parts
Acetylene glycol EO adduct: 0.5 parts
Deionized water (manufactured by Kawaken Fine Chemicals Co., Ltd.): the rest Substitute Specification (Clean)

=Magenta Ink=

(1) Preparation of Dispersion Liquid

First, using benzyl acrylate and methacrylic acid as raw materials, an AB-type block polymer with an acid value of 300 and a number average molecular weight of 2500 is made by a conventional method, and then neutralized with a potassium hydroxide aqueous solution and diluted with deionized water, so that a homogeneous 50 mass % polymer aqueous solution was prepared. Here, 100 g of the above-described polymer solution, 100 g of C.I. Pigment Red 122, and 300 g of deionized water were mixed and stirred mechanically for 0.5 hours. Next, this mixture was processed by passing the mixture five times into an interaction chamber under a liquid pressure of about 70 MPa using a micro-fluidizer. Furthermore, by performing a centrifuge separation process (12,000 rpm, for 20 minutes) to the dispersion liquid obtained as described above, non-dispersed materials including coarse particles were removed, so that a magenta dispersion liquid was obtained. The obtained magenta dispersion liquid had a pigment concentration of 10 mass % and a dispersant concentration of 5 mass %.

(2) Preparation of Resin Fine Particle Dispersion Liquid

A resin fine particle dispersion liquid was prepared using the same raw materials and preparation method as explained for the above-described black ink.

(3) Preparation of Ink

The above-described magenta dispersion liquid and the above-described resin fine particle dispersion liquid were used to prepare the ink. The following ingredients were added to these to obtain a predetermined concentration. Furthermore, after sufficiently mixing and stirring these components, the mixture was filtered under pressure using a microfilter with a pore size of 2.5 μm (manufactured by Fuji Film Corporation), so as to prepare a pigment ink with a pigment concentration of 4 mass % and a dispersant concentration of 2 mass %.

The above-described magenta dispersion liquid: 40 parts
The above-described resin fine particle dispersion liquid: 10 parts
Zonyl FSO-100 (fluorinated surfactant manufactured by DuPont): 0.05 parts
2-methyl 1,3 propanediol: 15 parts
2-Pyrrolidone: 5 parts
Acetylene glycol EO adduct: 0.5 parts
Deionized water (manufactured by Kawaken Fine Chemicals Co., Ltd.): the rest =Yellow Ink=

(1) Preparation of Dispersion Liquid

First, the above-mentioned anionic polymer P-1 was neutralized with a potassium hydroxide aqueous solution and diluted with deionized water to prepare a homogeneous 10 mass % polymer aqueous solution. Here, 30 parts of the above-described polymer solution, 10 parts of C.I. Pigment Yellow 74, and 60 parts of deionized water were mixed, charged into a batch type vertical sand mill (manufactured by Imex Corporation), filled with 150 parts of 0.3 mm diameter zirconia beads, and dispersed for 12 hours while cooling with water. Furthermore, the non-dispersed materials including coarse particles were removed by performing a centrifuge separation process to the dispersion liquid obtained as described above, so that a yellow dispersion liquid was obtained. The obtained yellow dispersion liquid had a solid content of about 12.5% and a weight average particle size of 120 nm.

(2) Preparation of Resin Fine Particle Dispersion Liquid

A resin fine particle dispersion liquid was prepared using the same raw materials and preparation method as explained for the above-described black ink.

(3) Preparation of Ink

The above-described yellow dispersion liquid and the above-described resin fine particle dispersion liquid were used to prepare the ink. The following components were mixed and sufficiently stirred to dissolve and disperse, and then the mixture was filtered under pressure using a micro-filter with a pore size of 1.0 μm (manufactured by Fuji Film Corporation), so as to prepare the ink.

The above-described yellow dispersion liquid: 40 parts

The above-described resin fine particle dispersion liquid: 10 parts

Zonyl FSO-100 (fluorinated surfactant manufactured by DuPont): 0.05 parts 2-methyl 1,3 propanediol: 15 parts 2-Pyrrolidone: 5 parts Acetylene glycol EO adduct: 0.5 parts Deionized water (manufactured by Kawaken Fine Chemicals Co., Ltd.): the rest Note that, although not used in the present embodiment, an example of the composition of white ink, which may be a target ink (described hereinafter) that can damage the water-repellent film as with black (K) ink, is as follows.

=White Ink=

(1) Preparation of Dispersion Liquid

Pre-dispersion of titanium oxide particles was performed using a homogenizer. Then, main dispersion was performed using a paint shaker using glass beads, and, after the glass beads were filtered off, deionized water was mixed. Furthermore, the non-dispersed materials including coarse particles were removed by performing centrifuge separation to the dispersion liquid obtained as described above, so that a white dispersion liquid was obtained. The obtained white dispersion liquid had a solid content of about 40.0%.

(2) Preparation of Resin Fine Particle Dispersion Liquid

A resin fine particle dispersion liquid was prepared using the same raw materials and preparation method as explained for the above-described black ink.

(3) Preparation of Ink

The above-described white dispersion liquid and the above-described resin fine particle dispersion liquid were used to prepare the ink. The following components were mixed and sufficiently stirred to dissolve and disperse, and then the mixture was filtered under pressure using a membrane filter with a pore size of 5.0 μm (manufactured by Sartorius), so as to prepare the ink.

The above-described white dispersion liquid: 40 parts

The above-described resin fine particle dispersion liquid: 10 parts

Zonyl FSO-100 (fluorinated surfactant manufactured by DuPont): 0.05 parts 2-methyl 1,3 propanediol: 15 parts 2-Pyrrolidone: 5 parts Acetylene glycol EO adduct: 0.5 parts Deionized water (manufactured by Kawaken Fine Chemicals Co., Ltd.): the rest "Resin fine particle" indicates fine particles which are made of resin and have a particle size that can be dispersed in an aqueous medium. The resin fine particles have a function of fixing a pigment to the surface of a print medium by melting by heating and forming a film on the surface of the print medium (film formation).

In the present embodiment, it is preferable that the glass transition point Tg of the resins constituting the resin fine particles is higher than 30° C. and lower than 80° C. In a case of 30° C. or lower, the difference between the glass transition point Tg of the resins and room temperature is small, and the resin fine particles in the ink are in a nearly molten state. Therefore, the viscosity of the ink increases in the print head 24, which may deteriorate the quality of images (color development, sharpness, etc.) due to defective ink ejection.

In a case of 80° C. or higher, a large amount of heat is required in the heating unit to melt the resin fine particles. Therefore, the resin fine particles cannot be molten before agglomeration of the pigment along with evaporation of water in the ink occurs, which may deteriorate the quality of images (color development, etc.).

The resin constituting the resin fine particles is not particularly limited as long as the glass transition point Tg satisfies the above-mentioned range. Specific examples include acrylic resin, styrene-acrylic resin, polyethylene resin, polypropylene resin, polyurethane resin, styrene-butadiene resin, fluoroolefin resin, and the like. For example, acrylic resin can be synthesized by emulsion polymerization of monomers such as (meth)acrylic acid alkyl esters and (meth)acrylic acid alkyl amides, etc. Further, styrene-acrylic resin can be synthesized by emulsion polymerization of s styrene monomer with (meth)acrylic acid alkyl esters, (meth)acrylic acid alkyl amides, or the like. By emulsion polymerization, an emulsion in which fine particles made of the above-mentioned resin (resin fine particles) are dispersed in a medium can be obtained.

As the resin fine particles with a sulfonic acid group in the present invention, resin fine particles which are insoluble in water and made of any commonly-used resin component can be used.

The resin component constituting the resin fine particles is not particularly limited as long as it is a resin that contains a sulfonic acid group, and any resin component such as any commonly-used natural or synthetic polymer or a polymer newly developed for the present embodiment can be used without restriction. In particular, polymers or copolymers of monomer components with radically polymerizable unsaturated bonds, such as acrylic resins and styrene/acrylic resins, can be used in view of general usability and easy functional design performance for resin fine particles.

Generally, surfactants are used as penetrants for the purpose of improving the permeability of ink into print media exclusively for inkjet. In the case of non-permeable print media, surfactants are used for the purpose of improving wettability. The greater the added amount of surfactant is, the stronger the property of lowering the surface tension of the ink becomes, which improves the wettability and permeability of ink to the print medium. It is preferable to use an acetylene glycol EO adduct, a fluorine-based surfactant, or a silicone-based surfactant. A fluorine-based or silicone-based surfactant can lower the surface tension of ink even with a small amount of content, and, therefore, can improve the wettability of ink to the print medium. Accordingly, even at the time of performing printing on a print medium with a non-water-absorbing property, the phenomenon in which the ink is repelled on the surface of the print medium is suppressed, and image quality can be further improved. In the case of the present embodiment, the surface tension of all inks was set to 30 dyn/cm or less as a preferable surface tension.

Further, since anionic coloring materials are used for any of the inks of the present embodiment, the pH of the inks is stable on the alkaline side, with their values being 8.5 to 9.5. From the viewpoint of preventing elution of impurities from a member in contact with the inks, deterioration of the materials constituting members, deterioration of the solubility of the pigment dispersed resin in the inks, etc., it is preferable that the pH of the inks is generally 7.0 or more and 10.0 or less. For the measurement of pH, PH METER model F-52 manufactured by Horiba, Ltd. was used. Note that the measuring device is not limited to the device exemplified above as long as the pH of the inks can be measured.

<Wiping Process>

With the above configuration, the printing apparatus 10 performs the wiping process for executing a wiping operation performed by the maintenance part 28 to the ejection port surface 34 of the print head 24, for example, at the timing described below. In the present embodiment, the timing to execute the wiping process is at the start of a printing process based on a job, after a predetermined number of printing operations have ended, at the time of transition to the next page during a printing process, at the start of a capping operation, and at the time of a cleaning operation.

Specifically, at the start of a printing process based on a job is a timing before the first page is printed in a printing process based on a job. In the printing apparatus 10, in a case when jobs are not continuously input, or the like, the print head 24 is capped with the cap 36 of the suction part 26 in the area S1 during the time of not-printing. Further, in the printing apparatus 10, preliminary ejection, which is ejection of ink that does not contribute to printing, is performed at a predetermined timing. In this way, this is for dealing with a possibility that the ink that had adhered to the cap 36 or the mist ink generated during the time of preliminary ejection may have adhered to the ejection port surface of the print head 24 at the start of a printing process.

After a predetermined number of printing operations have ended is a timing after a set number, e.g., ten times, of printing operations have ended during a printing process. Thereby, the wiping process is executed periodically during a printing process based on jobs. This is for dealing with a possibility that, during a printing process, mist ink generated during ink ejection from the print head 24 may cover part of the ejection ports or adhere to and solidify in the vicinities of the ejection ports, or a large amount of mist may aggregate and form an ink droplet that may fall.

At the time of transition to the next page during a printing process is a timing of transition to printing of the next page. Since the roll paper 27 is used in the printing apparatus 10, the print medium P may be cut by a cutter part (not illustrated in the drawings) at a timing of transition to the next page. In this way, this is for dealing with a possibility that paper dust and the like may be generated during cutting. Further, at the start of a capping operation is a timing at which the ejection port surface 34 of the print head 24 is capped with the cap 36, such as a timing after the end of printing. At the time of a cleaning operation is a timing during a cleaning operation executed together with the suction part 26. In the printing apparatus 10, after a suction operation such as ink suction performed by the suction part 26, a cleaning operation in which a wiping operation is executed to wipe off ink droplets adhering to the ejection port surface 34 is executed.

=Wiping Operation=

Figure 7A:
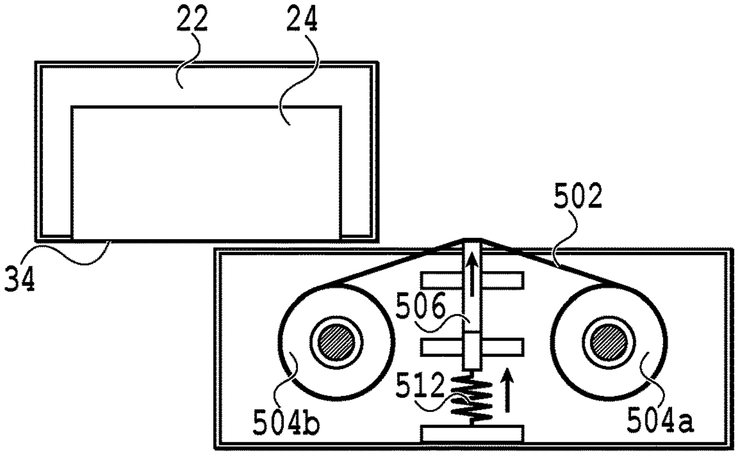
FIG. 7A to FIG. 7C are diagrams for explaining a wiping operation.
Figure 7B:
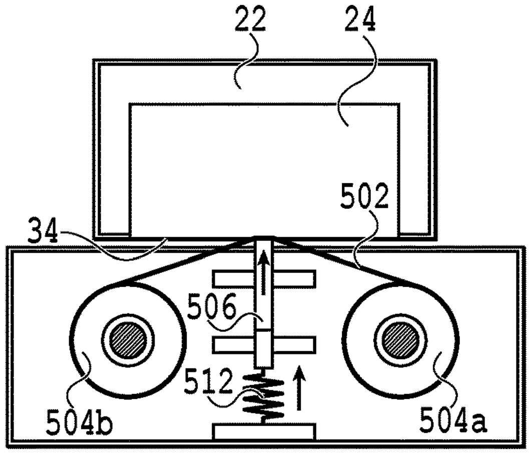
Figure 7C:
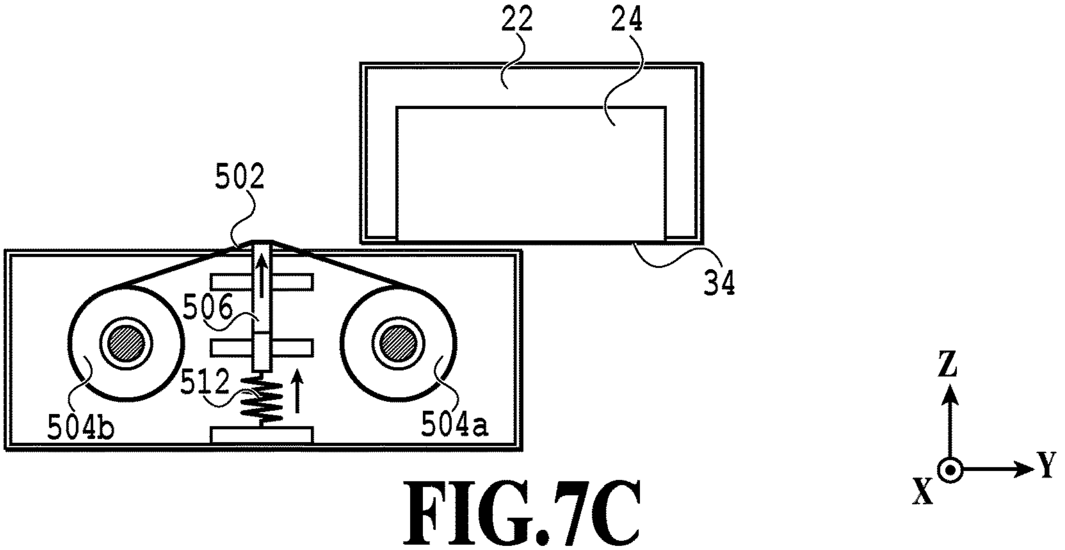

Here, an explanation is given of a wiping operation in which the maintenance part 28 wipes the ejection port surface 34 of the print head 24. FIG. 7A to FIG. 7C are diagrams for explaining the wiping operation. The wiping process executed at each timing described above is a process including the wiping operation explained with reference to FIG. 7A to FIG. 7C.

The wiping operation is executed under the control of the control part 600 (CPU 602). In the wiping operation, first, the print head 24 is moved to the wiping position which is set within the area Sc. Further, the maintenance part 28 is moved to the wiping start position. The wiping start position is a position where the wiping member 502 does not abut on the ejection port surface 34 of the print head 24 at the time the wiping member 502 is pressed by the pressing member 506, and is a position (for example, the second position) on the other side in the Y direction relative to the print head 24 located at the wiping position (see FIG. 7A).

Next, the pressing member 506 is raised to be in the state of pressing the wiping member 502 (see FIG. 7A), and, while maintaining this state, the maintenance part 28 is moved toward one side in the Y direction to reach the wiping end position. As the maintenance part 28 moves from the wiping start position toward one side in the Y direction, the portion of the wiping member 502 pressed by the pressing member 506 abuts on the ejection port surface 34, so that the ejection port surface 34 is wiped by that portion (see FIG. 7B). Accordingly, deposits such as the ink that has adhered to the ejection port surface 34 is removed by the wiping member 502. The wiping end position is a position where the wiping member 502 does not abut on the ejection port surface 34 or the like in the state where the wiping member 502 is pressed by the pressing member 506, and is a position (for example, the first position) on the one side in the Y direction relative to the print head 24 located at the wiping position (see FIG. 7C).

After that, the pressing member 506 is lowered to lower the wiping member 502 to a height position that does not abut on the print head 24 located at the wiping position as the maintenance part 28 moves, and then the maintenance part 28 is moved to a predetermined standby position. The standby position of the maintenance part 28 may be, for example, the wiping start position.

=Issues of Publicly-known Technologies=

By the way, deposits such as ink that has adhered to the ejection port surface 34 adheres to the wiping member 502 due to the wiping operation. Regarding the inks used in the printing apparatus 10, for example, an ink containing carbon black as a coloring material is used as the K ink, but carbon black has a large particle size and a certain hardness. Therefore, if the K ink containing carbon black as a coloring material adheres to the wiping member 502 and its adhesion amount is great, the coloring material may not be completely absorbed (permeate) into the wiping member 502 and may remain on the surface, for example. If the ejection port surface 34 is wiped with the wiping member 502 with carbon black remaining on the surface, the water-repellent film formed on the ejection port surface 34 may be damaged by the carbon black remaining on the surface, and the water repellency of the water-repellent film may deteriorate. If the water repellency of the water-repellent film deteriorates, the ink ejection characteristics deteriorate, such that the direction of ink ejection from the ejection ports tilts and the diameter and ejection speed of ink droplets vary.

Therefore, in the wiping operation, for example, after the movement to the wiping start position and before the pressing member 506 is raised, the rotary member 504*b* is rotated to wind up the wiping member 502. Accordingly, the portion to be pressed by the pressing member 506 (that is, the wiping area that wipes the area including the ejection port arrays 302 on the ejection port surface 34) is modified to an unused state, that is, to a state with no adhesion of ink. As described above, in the present embodiment, the winding part 504 functions as a modifying part that can modify the wiping area of the wiping member 502 that wipes a predetermined area including the ejection port arrays 302 on the ejection port surface 34. Further, in the present embodiment, winding is performed by 10 mm, which is longer than the length L2 of the pressing member 506 in the Y direction. Note that this winding amount may be any length but at least the length L2 (L2=5 mm) or longer. For example, if the length of the wiping member 502 mounted on the winding part 504 is 10 m, and the length of the wiping member 502 wound up for each wiping operation is 10 mm, the wiping member 502 will be replaced after approximately 1000 times of wiping operations.

However, in a case of a maintenance part with a form of winding up the wiping member for each wiping operation, the consumption amount of the wiping member increases, which results in an increase in the costs and the frequency of replacing the wiping member. Note that, as described above, the ink containing a coloring material that deteriorates the water-repellent film on the ejection port surface 34 is not limited to the K ink containing carbon black as a coloring material, but also there are various kinds of inks such as a white ink containing titanium oxide as a coloring material. Therefore, the target ink includes not only K ink and white ink, but also gray ink containing carbon black and titanium oxide as coloring materials, for example.

Figure 8A:
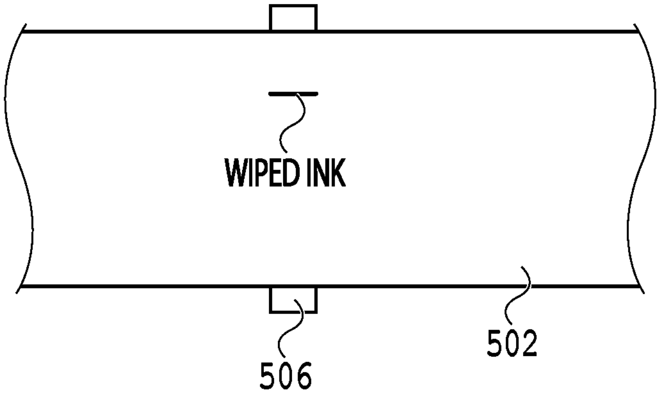
FIGS. 8A and 8B are diagrams illustrating ink that has adhered to a wiping member.
Figure 8B:
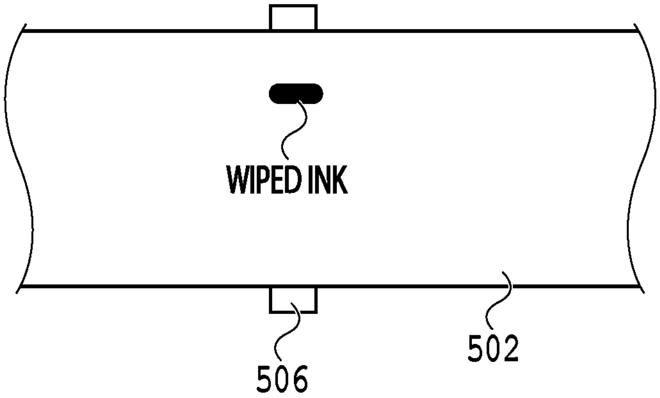

Here, an explanation is given of the adhesion amounts of ink adhering to the wiping member after a wiping operation in a case when there has been an ink ejection and in a case when there has been no ink ejection. FIG. 8A and FIG. 8B are diagrams for explaining the difference in the adhesion amounts of ink adhering to the wiping member 502 in cases of wiping an area including the ejection port arrays 302 corresponding to a predetermined ink and their vicinities. In FIG. 8A, the adhesion amount of ink adhering to the wiping member after a wiping operation in a case when there has been no ejection of ink is illustrated, and, in FIG. 8B, the adhesion amount of ink adhering to the wiping member after a wiping operation in a case when there has been an ejection of a certain amount of ink.

In the wiping operation, the area of the wiping member 502 pressed by the pressing member 506 abuts on the ejection port surface 34 and wipes the ejection port surface 34, and thus, the length of the area in the Y direction is approximately 5 mm, which corresponds to the length L2 of the pressing member 506 in the Y direction. In a case when there has been no ink ejection, the adhesion amount of ink adhering to the wiping member 502 is low (see FIG. 8A), and, in a case when there has been an ink ejection, the adhesion amount of ink adhering to the wiping member 502 is great (see FIG. 8B).

In a case when there has been no ink ejection, the adhesion amount of ink adhering to the wiping member 502 is low, and much of the coloring materials in the ink is absorbed from the surface of the wiping member 502 to its interior. Therefore, in the next wiping operation, even if the ejection port surface 34 is wiped with the same area of the wiping member 502, i.e., the same area as the area used for the wiping in the most recent wiping operation, it is prevented that the coloring materials damage the water-repellent film of the ejection port surface 34 in this wiping operation.

On the other hand, in a case when there has been an ink ejection, mist ink generated during the ink ejection adheres to the periphery of the ejection port arrays 302. Therefore, in a case when there has been an ink ejection, the amount of ink that adheres to the wiping member 502 is greater, compared to a case in which there has been no ink ejection. If the adhesion amount of ink is great, the coloring materials cannot be completely absorbed by the wiping member 502, and much of it will remain on the surface. Therefore, if the ejection port surface 34 is wiped with the same area of the wiping member 502 in the next wiping operation, the coloring materials remaining on the surface of the wiping member 502 damage the water-repellent film of the ejection port surface 34 in the wiping operation.

=Wiping Process=

In this way, the adhesion amount of ink adhering to the wiping member 502 varies depending on whether or not there has been an ink ejection or on the ejection amount. Therefore, in the present embodiment, during a wiping process, the winding of the wiping member 502 is controlled according to the adhesion amount of a target ink (predetermined ink) adhering to the wiping member 502 after a wiping operation. Specifically, in a case when the adhesion amount of target ink adhering to the wiping member 502 is low, the wiping member 502 is not wound up (or the winding amount is reduced). The target ink is an ink containing a substance, such as carbon black, that can damage the water-repellent film. Note that the target ink may be determined based on not only the types of coloring materials that can damage the water-repellent film, but also on the content of such coloring materials. That is, the target ink may be a high-concentration ink containing such coloring materials at a high concentration. Alternatively, the target ink may be, for example, an ink that thickens or solidifies easily. That is, the target ink may be an ink that can deteriorate the ejection characteristics of ink from the ejection ports if the ink adheres to the wiping member.

Figure 9:
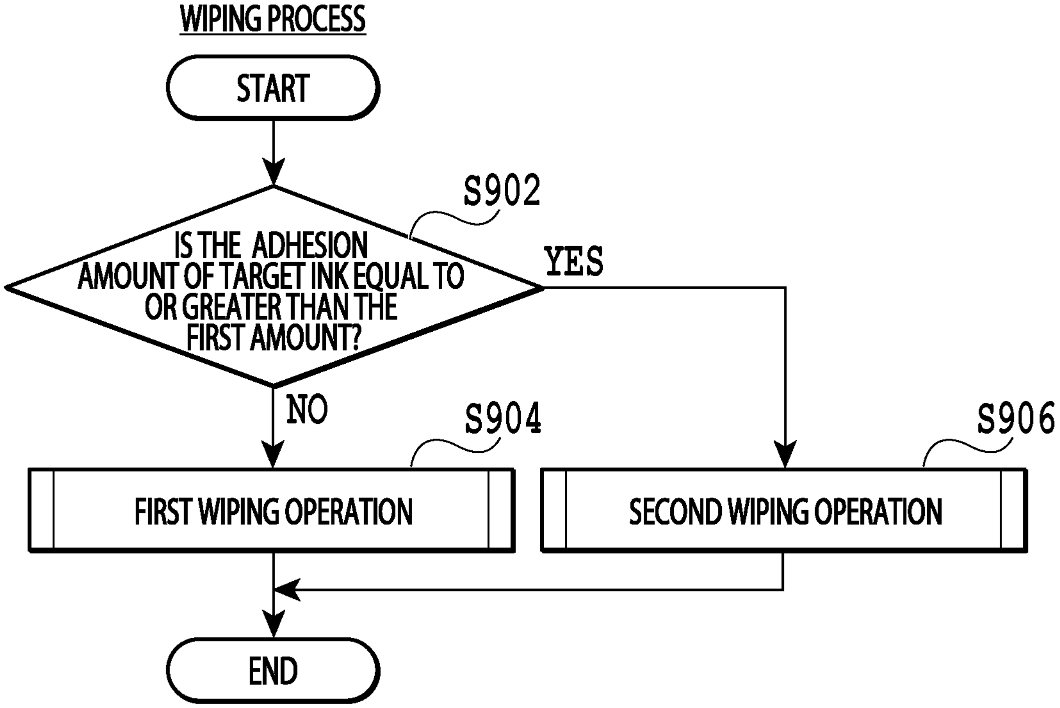
FIG. 9 is a flowchart of a wiping process in the first embodiment.
Figure 10A:
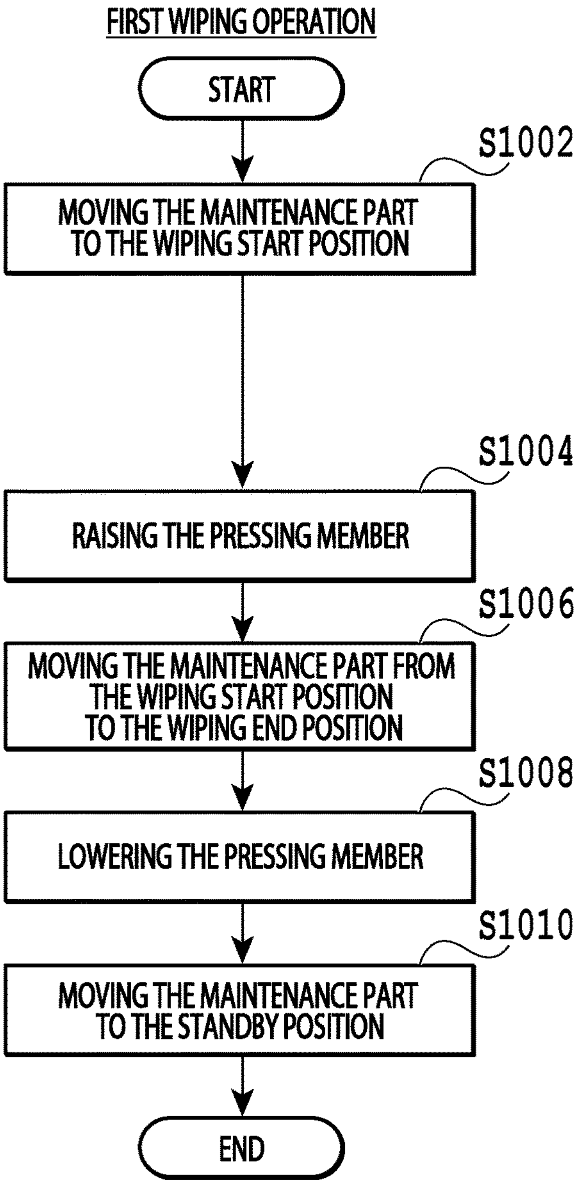
FIG. 10A and FIG. 10B are flowcharts of wiping operations which are subroutines of the wiping process of FIG. 9.
Figure 10B:
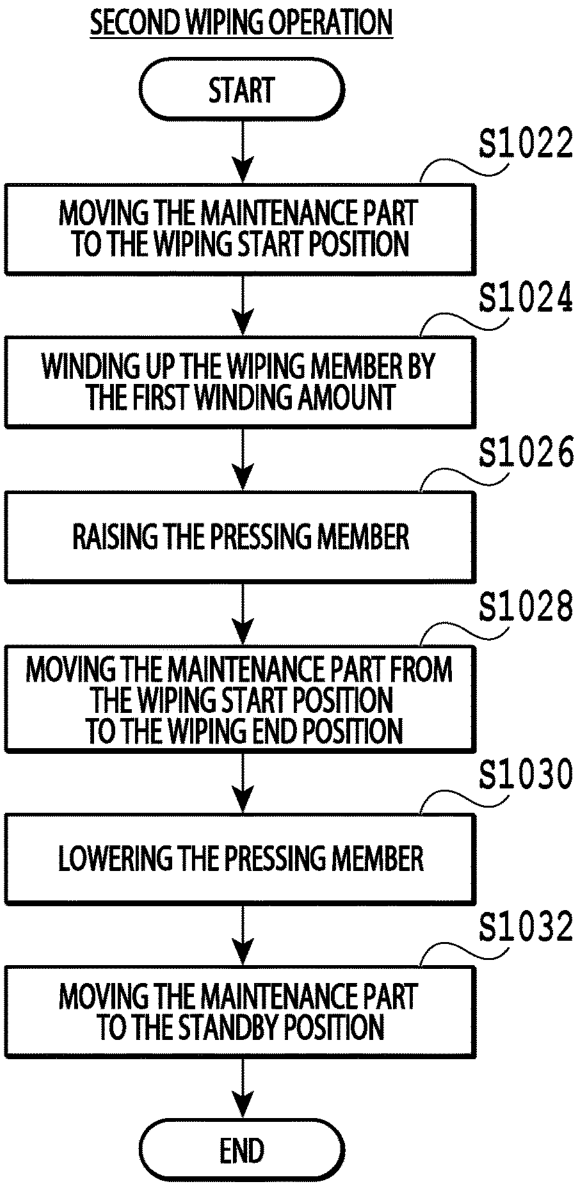

Hereafter, an explanation is given of details of processing of the wiping process executed in the printing apparatus 10 according to the present embodiment. FIG. 9 is a flowchart illustrating details of processing of the wiping process executed in the printing apparatus 10. FIG. 10A and FIG. 10B are subroutines of the wiping process of FIG. 9. FIG. 10A is a flowchart illustrating details of processing of the first wiping operation, and FIG. 10B is a flowchart illustrating details of processing of the second wiping operation. The series of the processes illustrated in these flowcharts are performed by the CPU 602 loading a program code stored in the ROM 604 into the RAM 606 and executing the code. Alternatively, a part or all of the functions in the steps of these flowcharts may be executed by hardware such as an ASIC or an electronic circuit. Note that the sign “S” in the explanation of each process indicates that it is a step in the flowchart (the same applies hereafter in the present specification).

If the wiping process is started, first, in S902, the CPU 602 determines whether or not the adhesion amount of target ink adhering to the wiping member 502 is equal to or greater than the first amount. In S902, first, the CPU 602 controls the sensor 202 so that the sensor 202 detects the concentration of the target ink that was wiped in the most recent wiping operation and has adhered to the wiping member 502. Note that, in the present embodiment, the target ink is K ink. In the detection of the ink concentration on the wiping member 502 using the sensor 202, the maintenance part 28 is positioned at the concentration detection position within the area Sc. The concentration detection position is a position within the area Sc where the sensor 202, which is mounted on the carriage 22 that moves, can detect the ink that adhered to the wiping member 502 in the most recent wiping operation. In the present embodiment, the position where the ink that adhered to the wiping member 502 in the most recent wiping operation can be detected is a position where the portion to be pressed by the pressing member 506 can be detected. Further, the carriage 22 is moved in the X direction with respect to the maintenance part 28 located at the concentration detection position, and the sensor 202 detects the concentration of the target ink on the wiping member 502. Since the position of the carriage 22 in the X direction can be obtained using a linear encoder (not illustrated in the drawings), the concentration of the target ink and the concentration of other inks are determined based on the detection result from the sensor 202 and the position in the X direction. In S902, only the concentration of the target ink may be detected, or the concentrations of the target ink and other inks (inks other than the predetermined ink) may be detected. In the present embodiment, the other inks are C ink, M ink, and Y ink. Then, the print head 24 that has finished moving to detect the concentrations of inks is moved to the wiping position.

In S902, based on the detection result from the sensor 202, the CPU 602 next determines whether or not the concentration of the target ink is equal to or greater than the first threshold value. The first threshold value is a value corresponding to the concentration of the target ink at the time the first amount of target ink adheres to the wiping member 502, and is stored in a storage area. The first threshold value is the upper limit value of the concentration of the target ink that corresponds to the ink amount that does not damage the water-repellent film in a case when the wiping member 502 continuously performs a wiping operation at the same position, or is a value less than the upper limit value by a fixed value. Therefore, the first threshold value is changed depending on, for example, the type of target ink, the characteristics of the water-repellent film (such as abrasion resistance), and the characteristics of the wiping member 502 (such as permeability of a coloring material). Such a first threshold value is determined in experiments, for example. Therefore, in S902, if the concentration of the target ink is equal to or greater than the first threshold value, it is determined that the adhesion amount of target ink that has adhered to the wiping member 502 is equal to or greater than the first amount. Further, if the concentration of the target ink is lower than the first threshold value, it is determined that the adhesion amount of target ink that has adhered to the wiping member 502 is not equal to or greater than the first amount. Note that, although the concentration of the ink that has adhered to the wiping member 502 is detected by the sensor 202 in S902, it is also possible to detect the lightness of the ink and to execute the above-described determination based on the result of the detection.

If it is determined in S902 that the adhesion amount of target ink adhering to the wiping member 502 is not equal to or greater than the first amount, the processing proceeds to S904, and the CPU 602 executes the first wiping operation in which the wiping is performed without winding up the wiping member 502.

If the first wiping operation is started, first, in S1002, the CPU 602 moves the maintenance part 28 to the wiping start position, and, in S1004, the CPU 602 raises the pressing member 506 to press the wiping member 502. Here, the ink from the wiping of the ejection port surface 34 in the most recent wiping operation has adhered to the area of the wiping member 502 pressed by the pressing member 506.

Next, the processing proceeds to S1006, and the CPU 602 moves the maintenance part 28 from the wiping start position to the wiping end position while maintaining the state in which the wiping member 502 is pressed by the pressing member 506. In this process, the deposits such as the ink that has adhered to the ejection port surface 34 are wiped off by the wiping member 502. After that, the processing proceeds to S1008, and the CPU 602 lowers the pressing member 506 at the wiping end position. Then, the processing proceeds to S1010, and the CPU 602 moves the maintenance part 28 to the standby position while the pressing member 506 is not pressing the wiping member 502, and ends the first wiping operation, thereby ending the wiping process.

Further, if it is determined in S902 that the adhesion amount of target ink adhering to the wiping member 502 is equal to or greater than the first amount, the processing proceeds to S906, and the CPU 602 executes the second wiping operation in which the wiping is performed after winding up the wiping member 502.

If the second wiping operation is started, first, in S1022, the CPU 602 moves the maintenance part 28 to the wiping start position. Then, in S1024, the CPU 602 drives the rotary member **504*b* to wind up the wiping member 502 by the first winding amount, which is 10 mm in the present embodiment. Next, the processing proceeds to S1026, and the CPU 602 raises the pressing member 506 to press the wiping member 502. Here, no ink has adhered to the area of the wiping member 502 pressed by the pressing member 506**.

After that, the processing proceeds to S1028, and the CPU 602 moves the maintenance part 28 from the wiping start position to the wiping end position while maintaining the state in which the wiping member 502 is pressed by the pressing member 506. In this process, the deposits such as the ink that has adhered to the ejection port surface 34 are wiped off by the wiping member 502. Then, the processing proceeds to S1030, and the CPU 602 lowers the pressing member 506 at the wiping end position. After that, the processing proceeds to S1032, and the CPU 602 moves the maintenance part 28 to the standby position while the pressing member 506 is not pressing the wiping member 502, and ends the second wiping operation, thereby ending the wiping process.

<Functional Effect>

As explained above, in the present embodiment, the winding of the wiping member 502 is controlled according to the adhesion amount of ink containing a coloring material that can damage the water-repellent film formed on the ejection port surface 34 adhering to the wiping member 502 after the most recent wiping of the ejection port surface 34. Specifically, if the adhesion amount of ink adhering to the wiping member 502 in the most recent wiping operation is equal to or greater than the first amount, the wiping member 502 is wound up by the first winding amount before the current wiping operation is executed. Further, if the adhesion amount of ink adhering to the wiping member 502 in the most recent wiping operation is less than the first amount, the current wiping operation is executed without winding up the wiping member 502. Accordingly, in the printing apparatus 10, the consumption amount of the wiping member 502 can be suppressed while maintaining good ink ejection performance from each ejection port.

<Modification Examples of the First Embodiment>

Note that the above-described first embodiment may be modified as shown in the following (1) through (8).

(1) Although not specifically described in the above-described first embodiment, regarding the adhesion amount of ink adhering to the wiping member in the most recent wiping operation, as long as the ink containing a coloring material that can damage the water-repellent film is less than the first amount, the wiping member may not be wound up even if the other inks exceed the first amount. Note that the other inks are inks that do not contain coloring materials that can damage the water-repellent film, which are C ink, M ink, and Y ink in the present embodiment.

(2) In the above-described first embodiment, the wiping member is wound up if the adhesion amount of ink adhering to the wiping member is equal to or greater than the first amount, and is not wound up if the adhesion amount is less than the first amount. However, there is not a limitation as such. For example, the winding amount of the wiping member may be modified according to the adhesion amount of ink adhering to the wiping member. That is, if the adhesion amount of ink adhering to the wiping member is equal to or greater than the first amount, the winding amount of the wiping member is set to "large" (for example, 10 mm), and, if the adhesion amount is less than the first amount, the winding amount of the wiping member is set to "small" (for example, 5 mm). Alternatively, it is also possible that the winding of the wiping member may be controlled as no winding, the winding amount "large", or the winding amount "small" according to the adhesion amount of ink adhering to the wiping member. In this case, the adhesion amounts of ink are set in stages based on threshold values that correspond to the ink concentrations measured by the sensor 202. Note that the winding amounts are not limited to the above-described lengths, and, for example, the winding amount "large" may be approximately 5 mm, and the winding amount "small" may be 2.5 mm. In this case, a part of the area that had been pressed by the pressing member 506 before the winding (before the modification) (that is, the area used in the most recent wiping operation) is located in the area to be pressed by the pressing member 506 after the winding (after the modification).

First Example

Figure 11A:
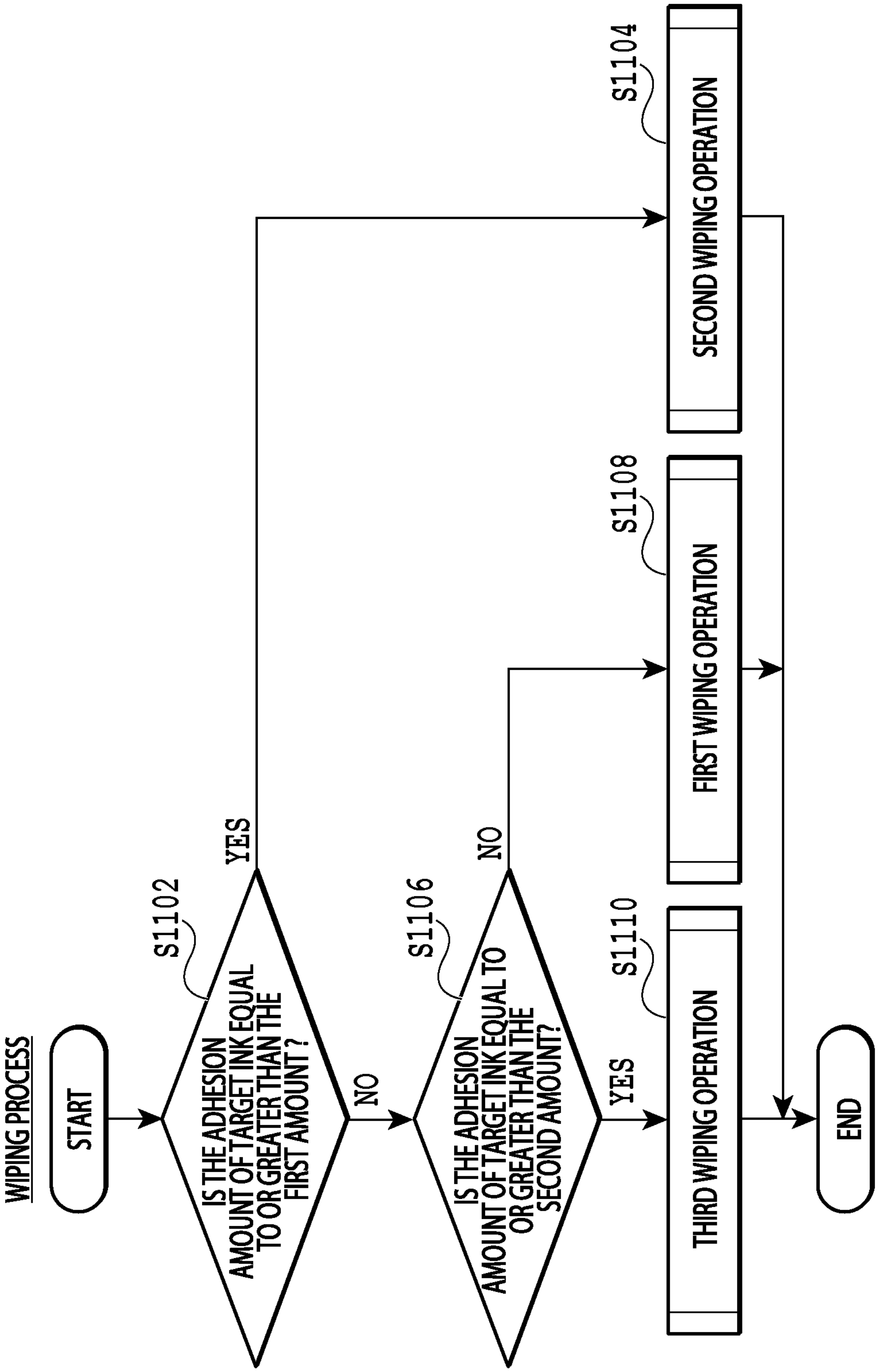
FIG. 11A and FIG. 11B are flowcharts illustrating a modification example of the wiping process of the first embodiment.
Figure 11B:
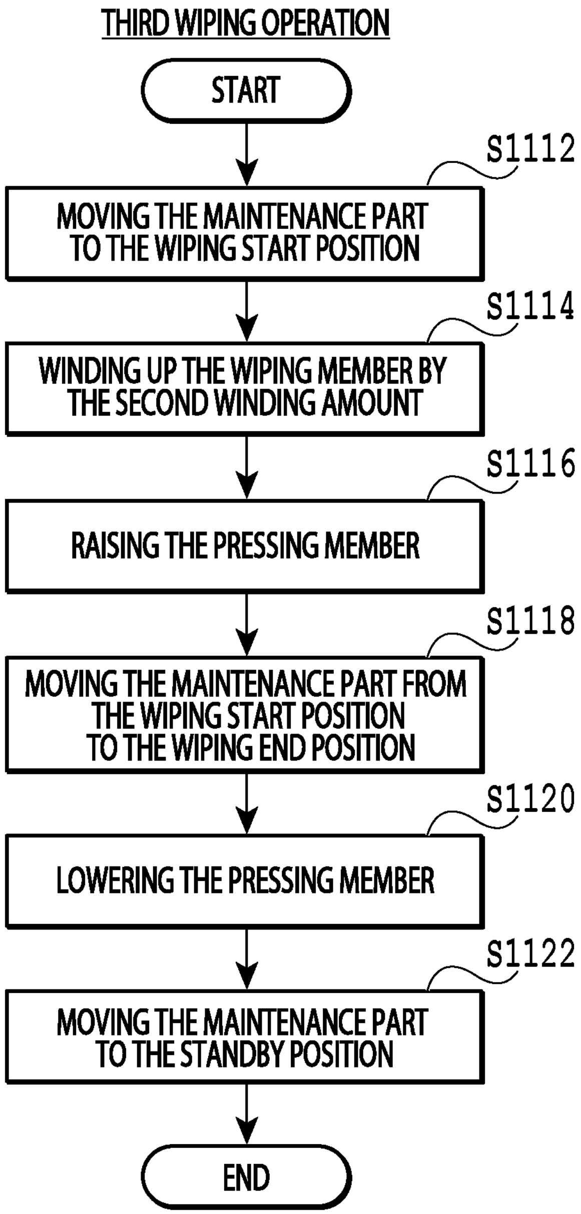

Below, with reference to FIG. 11A and FIG. 11B, an explanation is given of the case in which the winding of the wiping member is controlled in three stages, i.e., no winding, the winding amount "large", and the winding amount "small". Note that the winding of the wiping member may be controlled in four or more stages. FIG. 11A is a flowchart illustrating details of processing of the wiping process in which the winding of the wiping member is controlled in three stages. FIG. 11B is a flowchart illustrating details of processing of the third wiping operation which is a subroutine of the wiping process of FIG. 11A.

If the wiping process of FIG. 11A is started, first, in S1102, the CPU 602 determines whether or not the adhesion amount of target ink adhering to the wiping member 502 is equal to or greater than the first amount. Since the specific details of processing of S1102 are the same as those of S902 described above, the detailed explanations thereof are omitted. Furthermore, if it is determined in S1102 that the adhesion amount of target ink adhering to the wiping member 502 is equal to or greater than the first amount, the processing proceeds to S1104, and the CPU 602 executes the second wiping operation in which the wiping is performed after winding up the wiping member by the first winding amount, and ends this wiping process.

Further, if it is determined in S1102 that the adhesion amount of target ink adhering to the wiping member 502 is not equal to or greater than the first amount, the processing proceeds to S1106, and the CPU 602 determines whether or not the adhesion amount of target ink adhering to the wiping member 502 is equal to or greater than the second amount, which is less than the first amount. Specifically, based on the detection result from the sensor 202 obtained in S1102, whether or not the concentration of the target ink is equal to or greater than the second threshold value, which is less than the first threshold value, is determined. The second threshold value is a value corresponding to the concentration of the target ink at the time the second amount of target ink adheres to the wiping member 502, and is stored in a storage area. The second threshold value is the upper limit value of the concentration of the target ink that corresponds to the ink amount that does not damage the water-repellent film in a case when the wiping member 502 performs a wiping operation with the winding by the second winding amount, which is less than the first winding amount, or is a value less than the upper limit value by a fixed value. Such a second threshold value is determined in experiments, for example. In S1106, if the concentration of the target ink is equal to or greater than the second threshold value, it is determined that the adhesion amount of target ink adhering to the wiping member 502 is equal to or greater than the second amount. Further, if the concentration of the target ink is lower than the second threshold value, it is determined that the adhesion amount of target ink adhering to the wiping member 502 is not equal to or greater than the second amount.

If it is determined in S1106 that the adhesion amount of target ink adhering to the wiping member 502 is not equal to or greater than the second amount, the processing proceeds to S1108, and the CPU 602 executes the first wiping operation in which the wiping is performed without winding up the wiping member, and ends this wiping process. On the other hand, if it is determined in S1106 that the adhesion amount of target ink adhering to the wiping member 502 is equal to or greater than the second amount, the processing proceeds to S1110, and the CPU 602 executes the third wiping operation in which the wiping is performed after winding up the wiping member 502 by the second winding amount, which is less than the first winding amount.

If the third wiping operation is started, first, in S1112, the CPU 602 moves the maintenance part 28 to the wiping position, and, in S1114, the CPU 602 drives the rotary member 504*b*, so as to wind up the wiping member 502 by the second winding amount, which is 5 mm in the present embodiment. Next, the processing proceeds to S1116, and the CPU 602 raises the pressing member 506 to press the wiping member 502. After that, the processing proceeds to S1118, and the CPU 602 moves the maintenance part 28 from the wiping start position to the wiping end position while maintaining the state in which the wiping member 502 is pressed by the pressing member 506. In this process, the deposits such as the ink that has adhered to the ejection port surface 34 are wiped off by the wiping member 502. Then, the processing proceeds to S1120, and the CPU 602 lowers the pressing member 506 at the wiping end position. After that, the processing proceeds to S1122, and the CPU 602 moves the maintenance part 28 to the standby position while the pressing member 506 is not pressing the wiping member 502, and ends the third wiping operation, thereby ending the wiping process.

In this way, by controlling the winding amount of the wiping member 502 in three stages, it becomes possible to more reliably maintain the ink ejection performance from the ejection ports. Note that the specific values of the first winding amount and the second winding amount are set as appropriate according to various conditions such as the type of ink used, the type of the wiping member 502 used, and the thickness of the wiping member 502.

Second Example

Figure 12:
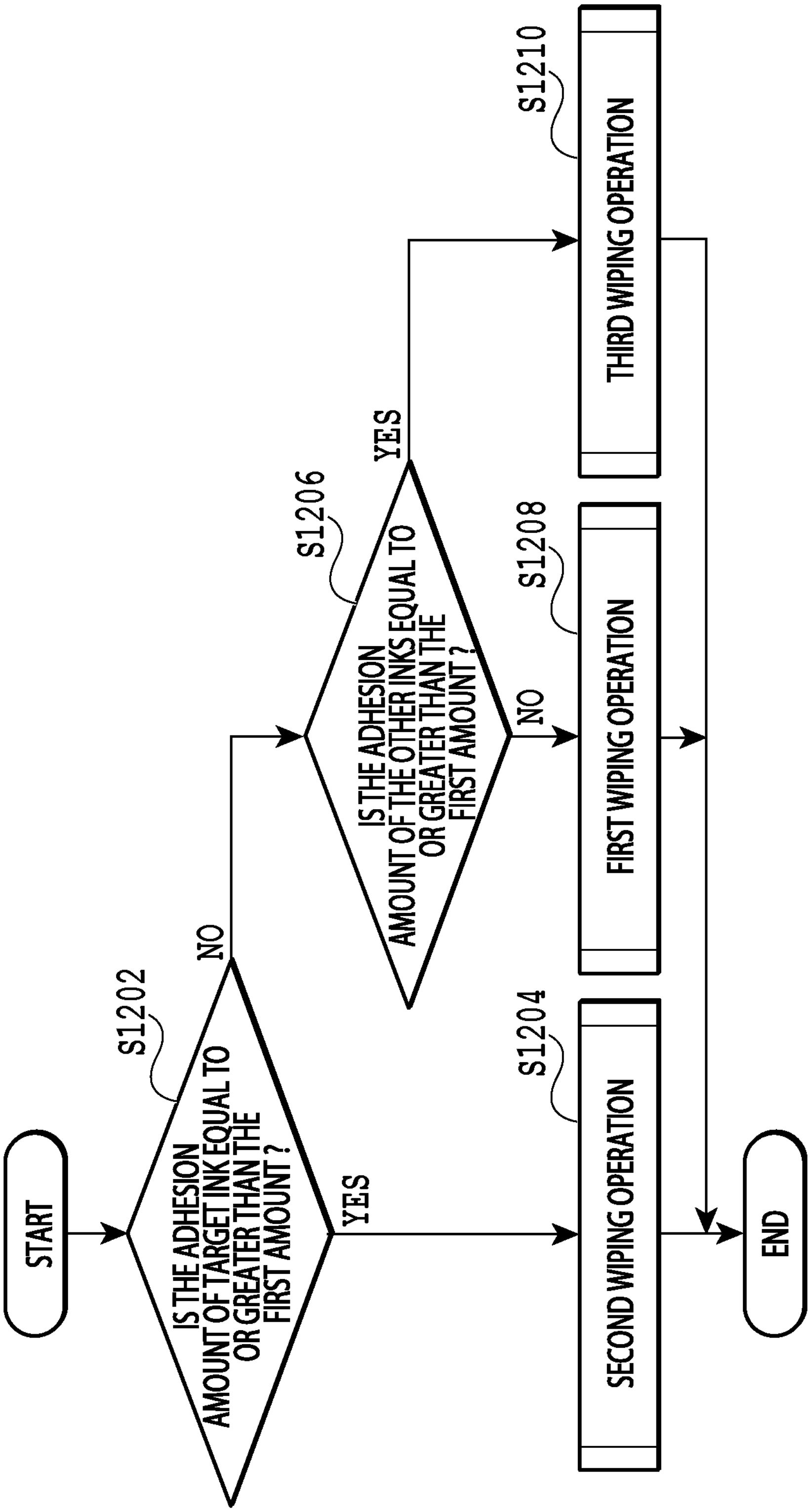
FIG. 12 is a flowchart illustrating a modification example of the wiping process of the first embodiment.

Further, in a case when the winding of the wiping member is controlled as no winding, the winding amount "large", or the winding amount "small", it is also possible to control the winding of the wiping member based on the adhesion amounts of the target ink and other inks adhering to the wiping member. Hereafter, with reference to FIG. 12, an explanation is given of the case when the winding of the wiping member is controlled as no winding, the winding amount "large", or the winding amount "small", based on the adhesion amounts of target ink and other inks adhering to the wiping member. FIG. 12 is a flowchart illustrating details of processing of a wiping process in which the winding of the wiping member is controlled in three stages, based on the adhesion amounts of target ink and other inks adhering to the wiping member.

If the wiping process of FIG. 12 is started, first, in S1202, the CPU 602 determines whether or not the adhesion amount of target ink adhering to the wiping member 502 is equal to or greater than the first amount. Since the specific details of processing of S1202 are the same as those of S902 described above, the detailed explanations thereof are omitted. Note that, in S1202, the adhesion amount of the other inks other than the target ink adhering to the wiping member is also detected. Furthermore, if it is determined in S1202 that the adhesion amount of target ink adhering to the wiping member 502 is equal to or greater than the first amount, the processing proceeds to S1204, and the CPU 602 executes the second wiping operation in which the wiping is performed after winding up the wiping member by the first winding amount, and ends this wiping process.

Further, if it is determined in S1202 that the adhesion amount of target ink adhering to the wiping member 502 is not equal to or greater than the first amount, the processing proceeds to S1206, and the CPU 602 determines whether or not the adhesion amount of the other inks adhering to the wiping member 502 is equal to or greater than the first amount. Specifically, based on the detection result from the sensor 202 obtained in S1202, whether or not the concentrations of the other inks are equal to or greater than the first threshold value is determined. In S1206, if the concentrations of all the other inks are equal to or greater than the first threshold value, it is determined that the concentration of the other inks adhering to the wiping member 502 is equal to or greater than the first amount. Further, if the concentration of at least one of the other inks is lower than the first threshold value, it is determined that the concentration of the other inks adhering to the wiping member 502 is not equal to or greater than the first amount. Note that the determination in S1206 is not limited as such. For example, if the concentration of at least one of the other inks is equal to or greater than the first threshold value, it may be determined that the concentration of the other inks adhering to the wiping member 502 is equal to or greater than the first amount. In this case, if the concentrations of all the other inks are lower than the first threshold value, it will be determined that the concentration of the other inks adhering to the wiping member 502 is not equal to or greater than the first amount.

If it is determined in S1206 that the adhesion amount of the other inks adhering to the wiping member 502 is not equal to or greater than the first amount, the processing proceeds to S1208, and the CPU 602 executes the first wiping operation in which the wiping is performed without winding up the wiping member, and ends this wiping process. Further, if it is determined in S1206 that the adhesion amount of the other inks adhering to the wiping member 502 is equal to or greater than the first amount, the processing proceeds to S1210, and the CPU 602 executes the third wiping operation in which the wiping is performed after winding up the wiping member by the second winding amount, and ends this wiping process.

Note that, in the above-described explanation, the ink containing a coloring material that can damage the water-repellent film is regarded as the target ink, and the inks not containing the coloring material is regarded as the other inks, and the winding amount of the wiping member 502 is controlled according to the adhesion amounts of these inks. However, there is not a limitation as such. For example, in a case when the printing apparatus 10 further ejects an ink containing a small amount of the above-described coloring material, the winding amount of the wiping member 502 may be controlled according to the adhesion amounts of these three types of ink.

Figure 13:
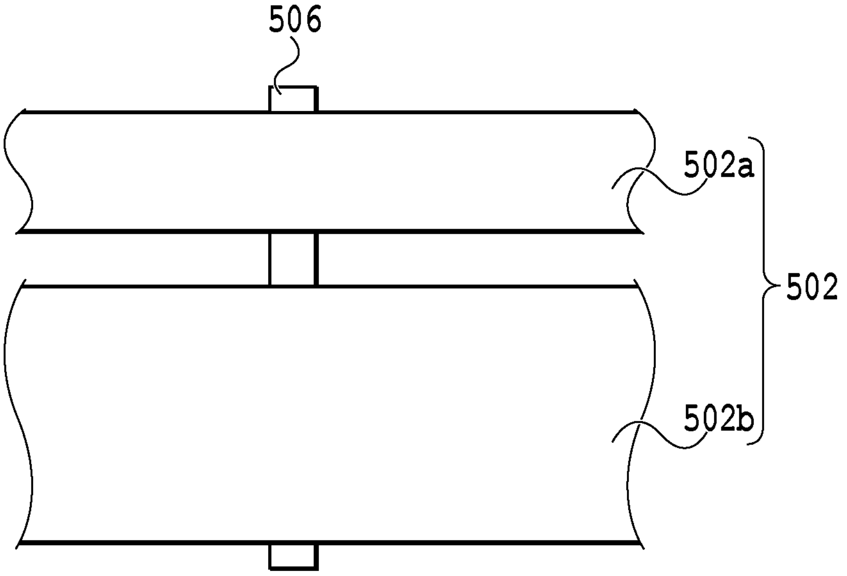
FIG. 13 is a diagram illustrating a modification example of the wiping member.

(3) In the above-described first embodiment, the wiping member 502 wipes the ejection port arrays 302 of the target ink and the ejection port arrays 302 of the other inks. However, there is not a limitation as such. For example, as in FIG. 13, it is also possible that each of the wiping member 502*a* that wipes the ejection port arrays 302 of the target ink and the wiping member 502*b* that wipes the ejection port arrays 302 of the other inks is independently installed in the maintenance part 28. In this case, for example, the wiping members 502*a* and 502*b* are held by the winding part 504 that can be controlled independently for each of them. FIG. 13 is a diagram illustrating a modification example of the wiping member 502.

(4) In the above-described first embodiment, the sensor 202 is installed on the carriage 22, and the adhesion amount of ink adhering to the wiping member 502 is detected by the relative movement of the maintenance part 28 that holds the wiping member 502 and the carriage 22. However, there is not a limitation as such. The sensor 202 may be installed at any position capable of detecting the concentration of the ink that adhered to the wiping member 502 in the most recent wiping operation. For example, it is also possible that the sensor 202 is installed independently from the carriage 22 so that the concentration of the ink can be detected while the maintenance part 28 is located at the wiping start position.

(5) In the above-described first embodiment, the adhesion amount of ink adhering to the wiping member 502 is obtained as information about the ink to be wiped, and the winding of the wiping member 502 is controlled based on this information. However, there is not a limitation as such. Upon ejection of ink from ejection ports, mist ink generated in the ejection adheres to the vicinities of the ejection ports, and such ink will be wiped off in a wiping operation. Therefore, it is also possible that the adhesion amount of ink adhering to an area including the ejection port arrays 302 and their vicinities is obtained as information about the ink to be wiped, and the winding of the wiping member 502 is controlled based on this information. Hereafter, in the present specification, "the adhesion amount of ink adhering to an area including the ejection port arrays 302 and their vicinities" may be appropriately referred to as "the adhesion amount of ink adhering to the vicinities of the ejection port arrays 302 (the vicinity of an ejection port array)". Alternatively, it is also possible that winding of the wiping member 502 is controlled based on the adhesion amount of ink adhering to the wiping member 502 and the adhesion amount of ink adhering to the vicinities of the ejection port arrays 302.

For the adhesion amount of ink adhering to the vicinities of the ejection port arrays 302, a sensor capable of detecting the adhesion amount of the ink is installed. Specifically, a sensor capable of detecting the concentration of an area including the entire ejection port arrays 302 and their vicinities may be used. Alternatively, another possible configuration is that a sensor capable of detecting an area including a part of the ejection port arrays 302 and their vicinities is installed, so as to detect the concentration in the entire ejection port arrays 302 and their vicinities by the relative movement of the print head 24 and the sensor.

Further, in this case, for example, the concentration of black color is detected for the ejection port arrays 302 that eject K ink. The greater the adhesion amount of K ink adhering to the vicinities of the ejection port arrays 302 is, the higher the concentration of black color detected by the sensor will be. Therefore, in a case of controlling the winding of the wiping member 502 based on the adhesion amount of ink adhering to the vicinities of the ejection port arrays 302, in S902, whether or not the adhesion amount of ink adhering to the vicinities of the ejection port arrays 302 that eject the target ink is equal to or greater than the set value (corresponding to the first amount) is determined. Here, if the concentration based on the detection result from the sensor is equal to or higher greater than the set value (corresponding to the first threshold value), it is determined that the adhesion amount of ink adhering to the vicinities of the ejection port arrays 302 is equal to or greater than the set value. Further, if the concentration is lower than the set value, it is determined that the adhesion amount of ink adhering to the vicinities of the ejection port arrays 302 is not equal to or greater than the set value.

Alternatively, it is also possible that the winding of the wiping member 502 is controlled based on the duty or the number of times of ejections of the target ink and the other inks according to the print data subsequent to the most recent wiping operation. As described above, mist is generated upon ejection of ink from ejection ports, and the greater the ejection amount or the number of times of ejection is, the more the generated mist will be. For this reason, the ejection duty, image duty, or number of times of ejections is obtained from the print data, so as to determine whether or not the obtained value is equal to or higher greater than a correspondingly set value, thereby controlling the winding of the wiping member 502.

Furthermore, in the present embodiment, at predetermined timings, the suction part 26 executes processes such as a suction process for forcibly suctioning ink from each ejection port, and a preliminary ejection process for ejecting ink that does not contribute to printing. Even in such processes, ink adheres to the ejection port surface 34, and the adhesion amount of ink adhering to the wiping member 502 increases. Therefore, after the most recent wiping operation, whether or not the suction process or the preliminary ejection process has been executed is determined, and, in a case when it is determined that at least one of the processes has been executed, the control for winding up the wiping member 502 is performed.

(6) In the above-described first embodiment the winding of the wiping member 502 is performed, based on the adhesion amount of ink adhering to the wiping member 502, after the movement to the wiping start position and before the raising of the pressing member 506. However, there is not a limitation as such. That is, it is also possible that the adhesion amount of ink adhering to the wiping member 502 is detected at the wiping end position after the pressing member is lowered, then the wiping member 502 is wound up according to the detection result, and, thereafter, the maintenance part 28 is moved to the standby position.

(7) In the above-described first embodiment, the adhesion amount of ink adhering to the area of the wiping member 502 to be pressed by the pressing member 506 is detected in the state not pressed by the pressing member 506. However, there is not a limitation as such. That is, it is also possible that the adhesion amount of ink adhering to the area of the wiping member 502 is detected in the state pressed by the pressing member 506. In this case, the sensor 202 is installed at a position where the wiping member 502 does not come into contact with other components during detection.

(8) The above-described first embodiment and various forms shown in (1) through (7) may be combined as appropriate.

Second Embodiment

Next, with reference to FIG. 14A to FIG. 18, an explanation is given of a printing apparatus according to the second embodiment. Note that, in the following explanation, the same or corresponding configurations as those of the above-described first embodiment are assigned with the same signs as those used in the first embodiment, so as to omit the detailed explanations thereof.

The second embodiment differs from the above-described first embodiment in an aspect that the application of a wiping liquid to the wiping member 502 is controlled according to the adhesion amount of target ink adhering to the wiping member 502. Specifically, in the second embodiment, in a case when the adhesion amount of target ink adhering to the wiping member 502 is equal to or greater than the first amount, the wiping liquid capable of re-dispersing the target ink is applied to the area of the wiping member 502 to be pressed by the pressing member 506. Further, in a case when the above-described adhesion amount is less than the first amount, the wiping liquid is not applied to the above-described area.

<Configuration for Applying the Wiping Liquid>

Figure 14A:
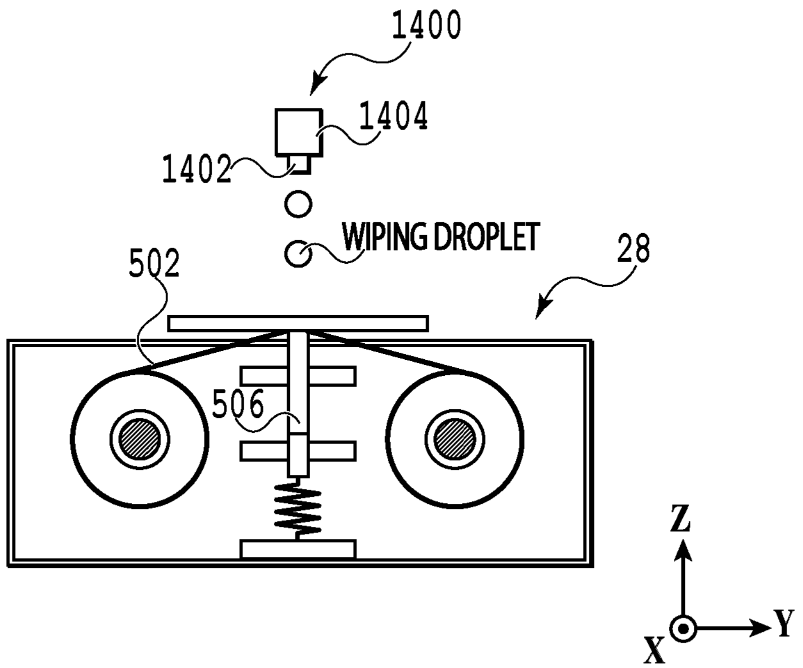
FIG. 14A and FIG. 14B are schematic configuration diagrams of a liquid application part.
Figure 14B:
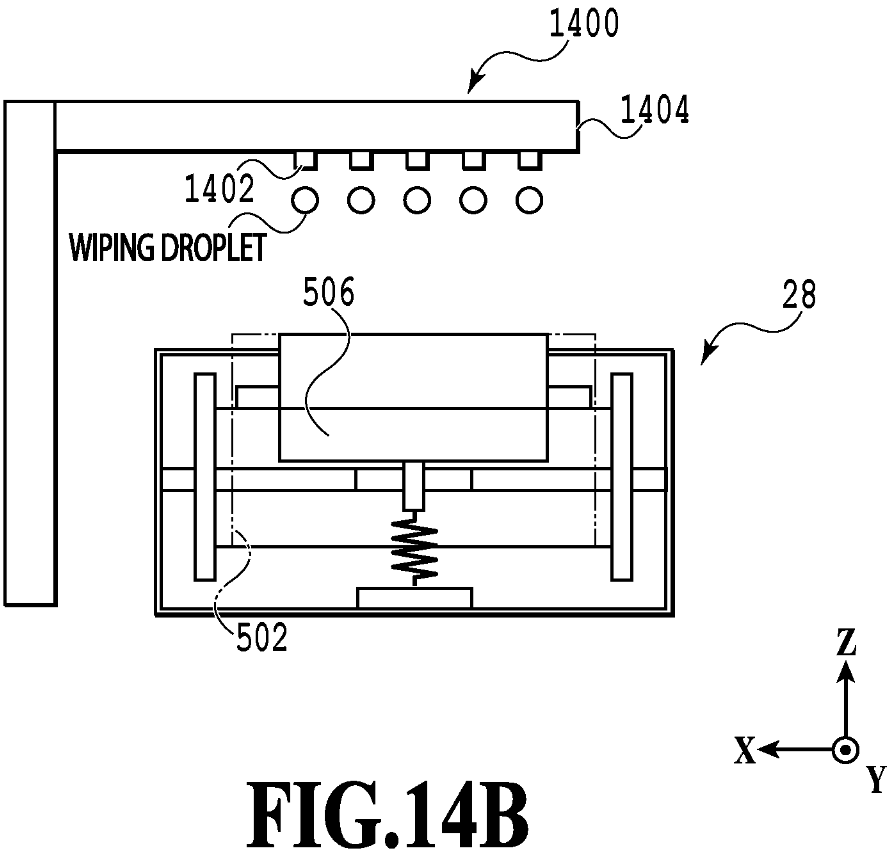

The second embodiment includes the liquid application part 1400 capable of applying a wiping liquid to the area of the wiping member 502 to be pressed by the pressing member 506 by ejecting the wiping liquid to the area from a predetermined position other than the area Sc of the movement area Sm of the maintenance part 28. FIG. 14A and FIG. 14B are diagrams for explaining the liquid application part 1400. Further, FIG. 14A is a side view diagram, and FIG. 14B is a front view diagram. The driving of the liquid application part 1400 is controlled by the control part 600.

The liquid application part 1400 is equipped with the liquid ejection part 1402 capable of ejecting the wiping liquid to the area of the wiping member 502 to be pressed by the pressing member 506 in the maintenance part 28 located at the liquid application position. In the present embodiment, the multiple liquid ejection parts 1402 are arranged side by side along the X direction above the wiping member 502 of the maintenance part 28 located at the liquid application position. The wiping liquid is fed to the liquid ejection parts 1402 from a wiping liquid tank that stores the wiping liquid via the tube 1404 using a pressure-applying mechanism. The liquid ejection parts 1402 eject the wiping liquid as droplets.

In the liquid application part 1400, an electromagnetic valve (not illustrated in the drawings) is installed on the upstream side of the liquid ejection parts 1402 in the wiping liquid feeding direction, so that the amount of wiping droplets to be ejected can be adjusted. In the present embodiment, a wiping liquid droplet of approximately 0.05 g is ejected from one liquid ejection part 1402. Accordingly, if one wiping droplet lands on the wiping member 502, a 1 cm square area becomes wet with the wiping liquid. In the present embodiment, the liquid ejection parts 1402 are installed so that the entire area of the wiping member 502 to be pressed by the pressing member 506 (that is, the area located directly above the pressing member 506) becomes wet with the wiping liquid. Note that the area to be wetted by the liquid ejection parts 1402 may match a predetermined area including each ejection port array 302 in the X direction.

Note that the liquid application parts 1400 are not limited to the configuration described above, and may apply the wiping liquid by a spray system, or may apply the wiping liquid by transfer using an application roller. Alternatively, another possible configuration is that the wiping liquid is ejected from the contact surface of the pressing member 506 against the wiping member 502, so that the wiping liquid is applied from the back side of the wiping member 502.

<Wiping Liquid>

The wiping liquid has a function of re-dispersing the ink adhering to the ejection port surface 34 or solidified ink. Accordingly, if the ejection port surface 34 is wiped with the wiping member 502 to which the wiping liquid has been applied, the ink that has adhered to, thickened, or solidified on the ejection port surface 34 is given fluidity, so that the ink is removed by the wiping member 502 more easily. Further, the wiping liquid has a function of promoting permeation of wiped ink, particularly ink containing a coloring material that can damage the water-repellent film on the ejection port surface 34, to the inside of the wiping member 502. As a result, the coloring material of the ink that adheres to the wiping member 502 after wiping penetrates to the inside of the wiping member 502, and, thus, the coloring material that damages the water-repellent film is likely to remain on the surface of the wiping member 502 (the surface that abuts on the ejection port surface 34) after wiping. Note that the wiping liquid may have the above-described function only for the target ink, or may have the above-described function for the target ink and other inks.

The wiping liquid may also have a function as a humectant, a surfactant, a pH stabilizer, a preservative, or the like, other than as a solvent. The application amount of wiping liquid depends on the suction force of the wiping member 502. However, there are not limitations, as long as the ink adhering to the ejection port surface 34 can be made to quickly permeate to the inside of the wiping member 502. Further, the specific value of the application amount of wiping liquid is set as appropriate, according to various conditions such as the type of ink used, the type of the wiping member 502 used, and the thickness of the wiping member 502. In the present embodiment, the wiping liquid was prepared by sufficiently mixing and stirring the following components and then filtering under pressure using a microfilter with a pore size of 2.5 μm (manufactured by Fujifilm).

Figure 15A:
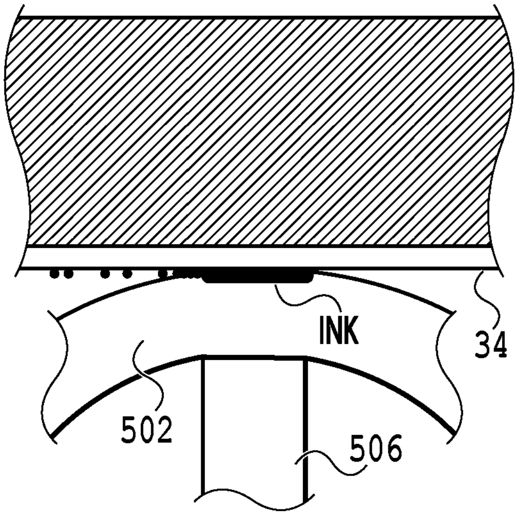
FIG. 15A to FIG. 15D are diagrams for explaining the function of a wiping liquid.
Figure 15B:
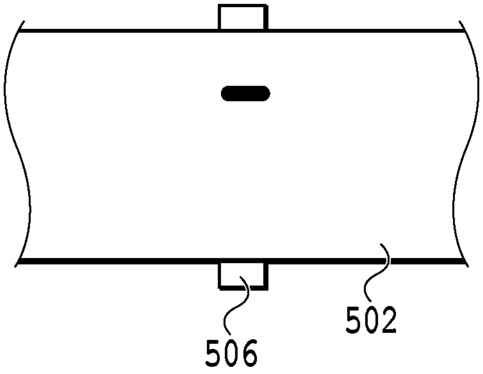
Figure 15C:
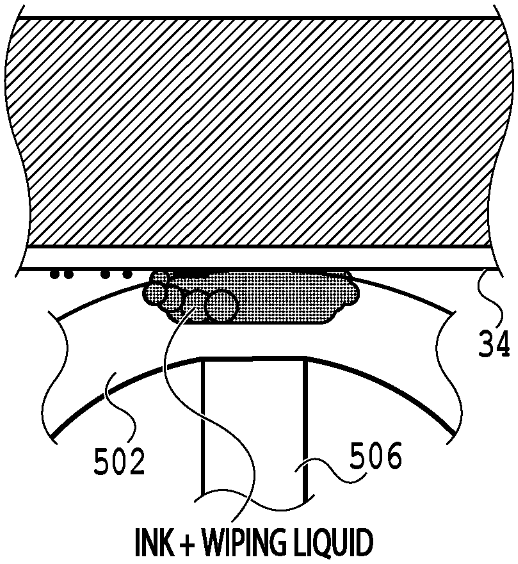
Figure 15D:
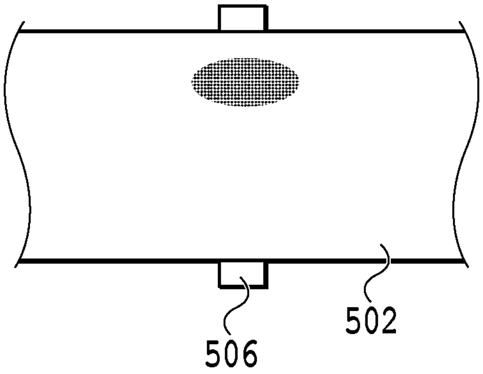

1-2 hexanediol: 3 parts
Triethylene glycol: 25 parts
Acetylene glycol EO adduct: 2 parts
Deionized water (manufactured by Kawaken Fine Chemicals Co., Ltd.): the rest With reference to FIG. 15A to FIG. 15D, an explanation is given of the function of the wiping liquid. FIG. 15A to FIG. 15D are diagrams for explaining the function of the wiping liquid. FIG. 15A is a diagram illustrating the wiping of the ejection port surface 34 using the wiping member 502 to which the wiping liquid has not been applied, and, in FIG. 15B, the ink adhering to the wiping member 502 after the wiping of FIG. 15A is illustrated. FIG. 15C is a diagram illustrating the wiping of the ejection port surface 34 using the wiping member 502 to which the wiping liquid has been applied, and, in FIG. 15D, the ink adhering to the wiping member 502 after the wiping of FIG. 15C is illustrated.

For wiping the ejection port surface 34, the area of the wiping member 502 pressed by the pressing member 506 abuts on the ejection port surface 34. As in FIG. 15A, in a case when the wiping liquid is not applied to the wiping member 502, after wiping the ink (caused by mist) adhering to the vicinities of the ejection port arrays 302, the ink is transferred to the wiping member 502, remaining its width (the length in the X direction) (see FIG. 15B). Furthermore, in a case when a large amount of ink adheres to the vicinities of the ejection port arrays 302, most of the coloring material remains on the surface of the wiping member 502 without permeating to the inside of the wiping member 502 (see FIG. 15A). Therefore, if the wiping member 502 wipes the ejection port surface 34 with the area where a large amount of coloring material such as carbon black remains on the surface, the coloring material remaining on the surface and the water-repellent film formed on the ejection port surface 34 rub against each other, and the water-repellent film will be damaged.

On the other hand, in a case when the wiping liquid is applied to the wiping member 502, the ink adhering to the ejection port arrays 302 quickly permeates to the inside of the wiping member 502 and spreads over the area where the wiping liquid has permeated (see FIG. 15C). Therefore, in this case, as in FIG. 15D, the ink is transferred to the wiping member 502 in the width (the length in the X direction) where the wiping liquid has permeated. Therefore, in this case, only a small amount of the coloring material remains on the surface of the wiping member 502. Therefore, even if the wiping member 502 wipes the ejection port surface 34 with the area of the wiping member 502 where the ink has adhered, the coloring material and the water-repellent film are unlikely to rub against each other, and the water-repellent film is unlikely to be damaged.

<Wiping Process>

Therefore, in the present embodiment, according to the adhesion amount of a target ink adhering to the wiping member 502 after a wiping operation, the wiping liquid is applied and the number of times the wiping member 502 is wound up is controlled. Specifically, in a case when the adhesion amount of target ink adhering to the wiping member 502 is less than the first amount, the wiping liquid is not applied, and the wiping member 502 is not wound up. Further, in a case when the adhesion amount of target ink adhering to the wiping member 502 is equal to or greater than the first amount, the wiping liquid is applied, and the wiping member 502 is not wound up.

Figure 16:
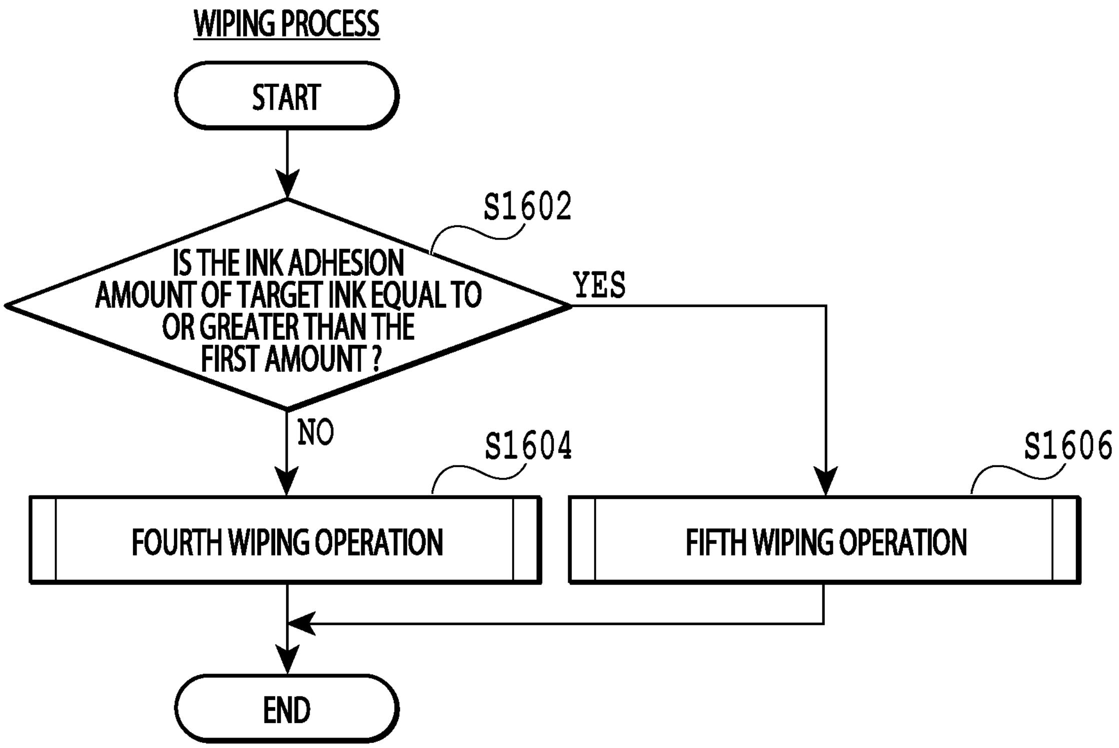
FIG. 16 is a flowchart of a wiping process in the second embodiment.
Figure 17A:
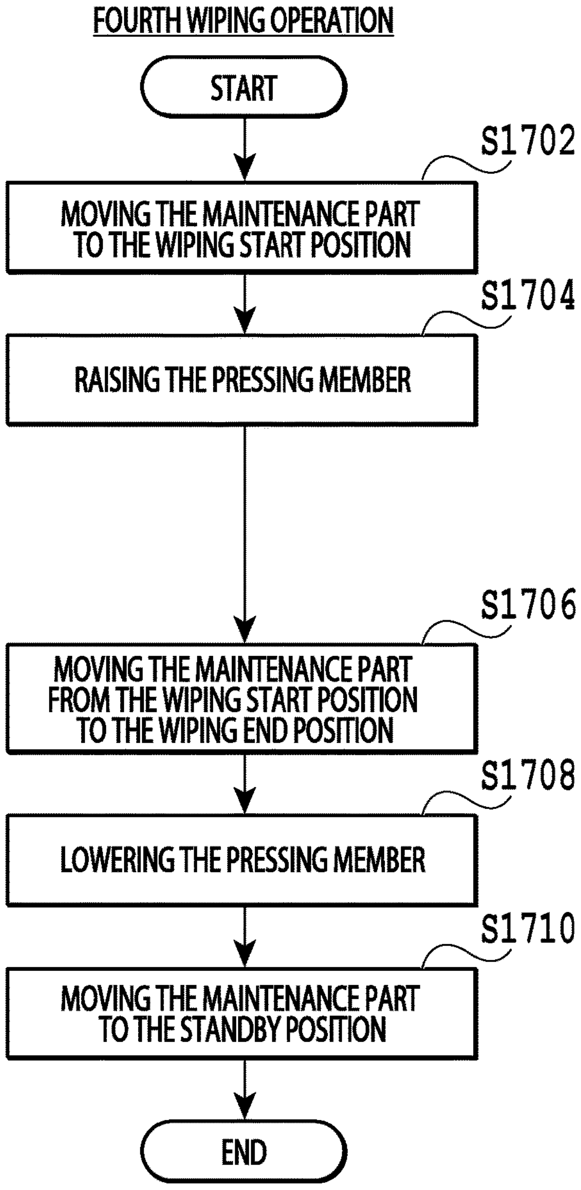
FIG. 17A and FIG. 17B are flowcharts of wiping operations which are subroutines of the wiping process of FIG. 16.
Figure 17B:
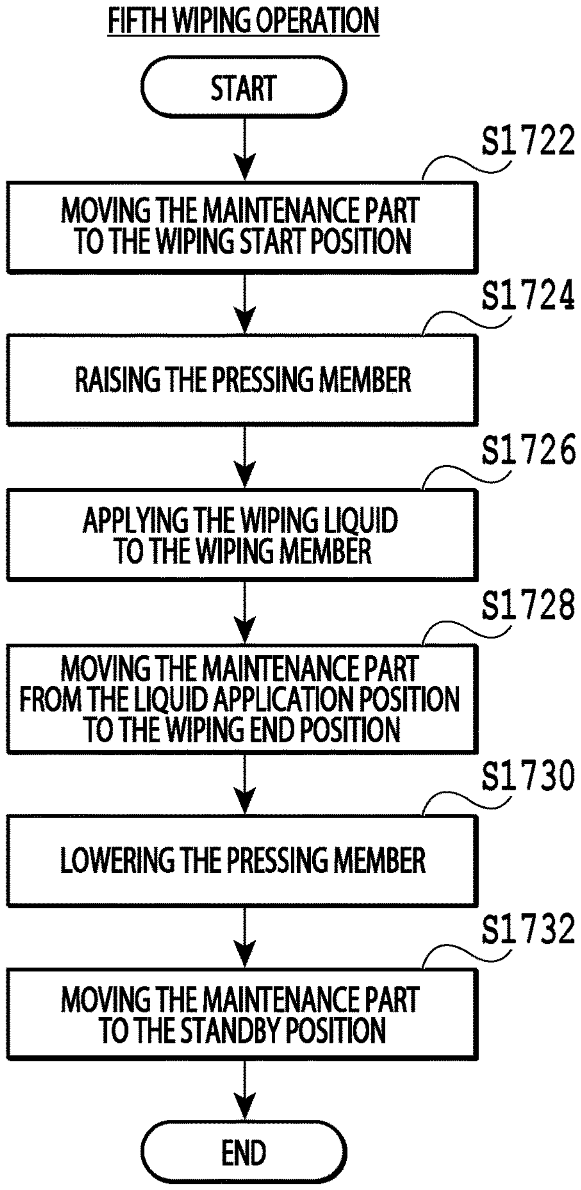

Hereafter, an explanation is given of details of processing of the wiping process executed in the printing apparatus 10 according to the present embodiment. FIG. 16 is a flowchart illustrating details of processing of the wiping process executed in the printing apparatus 10 according to the second embodiment. FIG. 17A and FIG. 17B are subroutines of the wiping process of FIG. 16. FIG. 17A is a flowchart illustrating details of processing of the fourth wiping operation, and FIG. 17B is a flowchart illustrating details of processing of the fifth wiping operation. The series of the processes illustrated in these flowcharts are performed by the CPU 602 loading a program code stored in the ROM 604 into the RAM 606 and executing it. Alternatively, a part or all of the functions in the steps of these flowcharts may be executed by hardware such as an ASIC or an electronic circuit.

If the wiping process is started, first, in S1602, the CPU 602 determines whether or not the adhesion amount of target ink adhering to the wiping member 502 is equal to or greater than the first amount. Since the specific details of processing of S1602 are the same as those of S902 described above, the specific details of processing thereof are omitted. If it is determined in S1602 that the adhesion amount of target ink adhering to the wiping member 502 is not equal to or greater than the first amount, the processing proceeds to S1604, and the CPU 602 executes the fourth wiping operation in which the wiping is performed without applying the wiping liquid to the wiping member 502 nor winding up the wiping member 502.

If the fourth wiping operation is started, first, in S1702, the CPU 602 moves the maintenance part 28 to the wiping start position, and, in S1704, the CPU 602 raises the pressing member 506 to press the wiping member 502. Here, the ink of only less than the first amount from the wiping of the ejection port surface 34 in the most recent wiping operation has adhered to the pressed area of the wiping member 502.

Next, the processing proceeds to S1706, and the CPU 602 moves the maintenance part 28 from the wiping start position to the wiping end position while maintaining the state in which the wiping member 502 is pressed by the pressing member 506. In this process, the deposits such as the ink that has adhered to the ejection port surface 34 are wiped off by the wiping member 502. After that, the processing proceeds to S1708, and the CPU 602 lowers the pressing member 506 at the wiping end position. Then, the processing proceeds to S1710, and the CPU 602 moves the maintenance part 28 to the standby position while the pressing member 506 is not pressing the wiping member 502, and ends the fourth wiping operation, thereby ending the wiping process.

Further, if it is determined in S1602 that the adhesion amount of target ink adhering to the wiping member 502 is equal to or greater than the first amount, the processing proceeds to S1606, and the CPU 602 executes the fifth wiping operation in which the wiping is performed after applying the wiping liquid to the wiping member 502 without winding up the wiping member 502.

If the fifth wiping operation is started, first, in S1722, the CPU 602 moves the maintenance part 28 to the wiping start position, and, in S1724, the CPU 602 raises the pressing member 506 to press the wiping member 502. Here, the ink of the first amount or more from the wiping of the ejection port surface 34 in the most recent wiping operation has adhered to the pressed area of the wiping member 502.

Next, the processing proceeds to S1726, and the CPU 602 moves the maintenance part 28 to the liquid application position while maintaining the state in which the wiping member 502 is pressed by the pressing member 506, and applies the wiping liquid to the area of the wiping member 502 pressed by the pressing member 506. From the wiping start position to the liquid application position, the wiping member 502 is in the pressed state. Therefore, the printing apparatus 10 is designed with no configuration that the wiping member 502 pressed by the pressing member 506 comes into contact with between the wiping start position to the liquid application position. Note that the timing for applying the wiping liquid may be before the maintenance part 28 is moved to the wiping start position, or after the maintenance part 28 is moved to the wiping start position and before the pressing member is raised. In this case, regarding the printing apparatus 10, the degree of freedom in the arrangement position of the liquid application part 1400 is increased. Further, the liquid application position may match the wiping start position.

After that, the processing proceeds to S1728, and the CPU 602 instructs the movement from the liquid application position to the wiping end position while maintaining the state in which the wiping member 502 is pressed by the pressing member 506. In this process, the deposits such as the ink that has adhered to the ejection port surface 34 are wiped off by the wiping member 502. Therefore, the printing apparatus 10 is designed so that the wiping member 502 pressed by the pressing member 506 does not come into contact with anything but the ejection port surface 34 between the liquid application position to the wiping end position.

Here, the ink of the first amount or more from the most recent wiping operation has adhered to the area pressed by the pressing member 506 of the wiping member 502 that wipes the ejection port surface 34. However, the wiping liquid is applied to the area in S1726, which is immediately before the wiping. Accordingly, the coloring material of the target ink remaining on the surface of the area is re-dispersed by the applied wiping liquid and permeates to the inside of the wiping member 502, and thus the amount remaining on the surface decreases. Therefore, even if the ejection port surface 34 is wiped with the area without winding up the wiping member 502, the water-repellent film is not easily damaged.

After the maintenance part 28 is moved to the wiping end position in S1728, the processing proceeds to S1730, and the CPU 602 lowers the pressing member 506 at the wiping end position. After that, the processing proceeds to S1732, and the CPU 602 moves the maintenance part 28 to the standby position while the pressing member 506 is not pressing the wiping member 502, and ends the fifth wiping operation, thereby ending the wiping process.

<Functional Effect>

As explained above, in the present embodiment, the application and non-application of the wiping liquid to the wiping member 502 is controlled according to the adhesion amount of ink containing a coloring material that can damage the water-repellent film formed on the ejection port surface 34 adhering to the wiping member 502 after the most recent wiping of the ejection port surface 34. Specifically, if the adhesion amount of ink adhering to the wiping member 502 in the most recent wiping operation is equal to or greater than the first amount, the wiping liquid with the function of re-dispersing ink is applied to the wiping member without winding up the wiping member before the current wiping operation is executed. Accordingly, in the current wiping operation, the ejection port surface 34 is wiped with the area where the amount of coloring material remaining on the surface has been reduced by the wiping liquid, and thus it is possible to suppress deterioration of the ink ejection performance and suppress the consumption of the wiping member.

<Modification Examples of the Second Embodiment>

(9) Although not particularly described in the second embodiment above, upon executing the fifth wiping operation in the wiping process, the execution of the fifth wiping operation in the wiping process is stored in the printing apparatus 10. Furthermore, in a wiping process, if the most recent wiping operation is the fifth wiping operation, the second wiping process in which the wiping is performed after winding up the wiping member 502 may be executed regardless of the determination result in S1602. Alternatively, in a wiping process, if the most recent wiping operation is the fifth wiping operation, the second wiping process may be executed in a case when the adhesion amount of the target ink is equal to or greater than the first amount according to the determination result in S1602.

(10) Although not particularly described in the second embodiment above, even if the adhesion amount of the other inks adhering to the wiping member 502 is equal to or greater than the first amount, the winding of the wiping member 502 and the application of the wiping liquid are not performed. Although not specifically described in the second embodiment above, in a case when the adhesion amount of target ink adhering to the wiping member 502 is equal to or greater than the first amount, the application amount of wiping liquid may be made great, and, in a case when the adhesion amount of the other inks adhering to the wiping member 502 is equal to or greater than the first amount, the application amount of wiping liquid may be made low. In the case when the application amount of wiping liquid is large, for example, about 0.1 g of wiping liquid is applied, and, in the case when the application amount of wiping liquid is small, for example, 0.05 g of wiping liquid is applied. That is, in this case, in a case when the adhesion amount of target ink adhering to the wiping member 502 is equal to or greater than the first amount, the application amount of wiping liquid is made great regardless of the adhesion amount of the other inks. Further, in a case when the adhesion amount of target ink adhering to the wiping member 502 is less than the first amount, the application amount of wiping liquid is made low if the adhesion amount of the other inks is equal to or greater than the first amount, and the wiping liquid is not applied if the adhesion amount of the other inks is less than the first amount. Accordingly, it is possible to suppress the consumption amount of wiping liquid.

Figure 18:
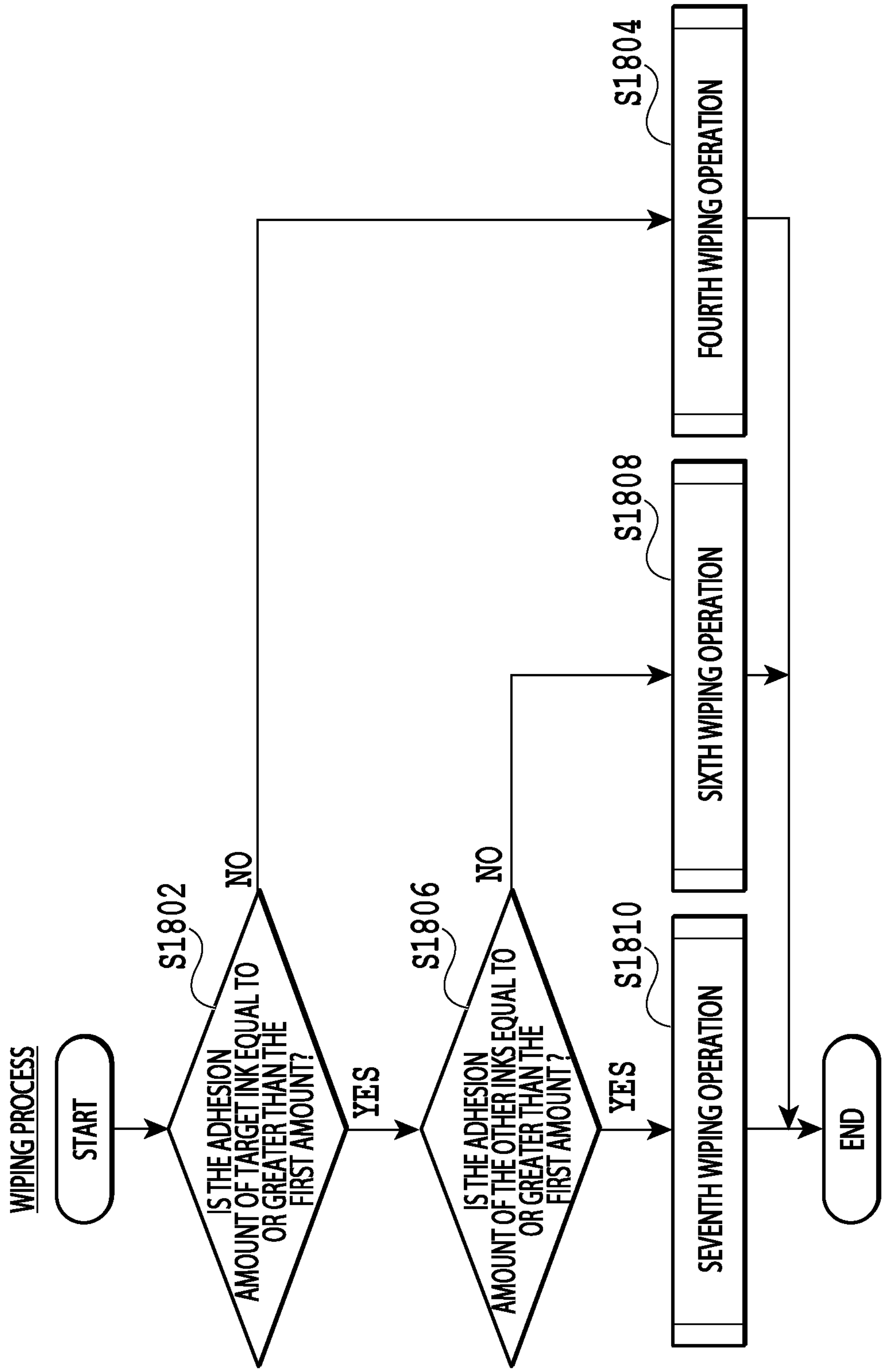
FIG. 18 is a flowchart illustrating a modification example of the wiping process of the second embodiment.

Hereafter, with reference to FIG. 18, an explanation is given of a case of controlling the wiping liquid in three stages, i.e., no application, the application amount “large”, and the application amount “small”. Note that the application of the wiping liquid may be controlled in four or more stages. In this case, the adhesion amounts of ink are set in stages according to threshold values that correspond to the ink concentrations measured by the sensor 202. Further, the application amounts of the wiping liquid are set in stages according to the amounts of wiping liquid that can be ejected from the liquid ejection parts 1402. FIG. 18 is a flowchart illustrating details of processing of the wiping process in which the application of the wiping liquid is controlled in three stages.

If the wiping process is started, first, in S1802, the CPU 602 determines whether or not the adhesion amount of target ink adhering to the wiping member 502 is equal to or greater than the first amount. Since the specific details of processing of S1802 are the same as those of S902 described above, the specific details of processing thereof are omitted. If it is determined in S1802 that the adhesion amount of target ink adhering to the wiping member 502 is not equal to or greater than the first amount, the processing proceeds to S1804, and the CPU 602 executes the fourth wiping operation in which the wiping is performed without applying the wiping liquid to the wiping member 502 nor winding up the wiping member 502.

Further, if it is determined in S1802 that the adhesion amount of target ink adhering to the wiping member 502 is equal to or greater than the first amount, the processing proceeds to S1806, and the CPU 602 determines whether or not the adhesion amount of the other inks adhering to the wiping member 502 is equal to or greater than the first amount. Since the details of processing of S1806 are the same as those of S902 described above except that the target of the detection performed by the sensor is changed from the target ink to the other inks, and thus the details of processing thereof are omitted.

If it is determined in S1806 that the adhesion amount of the other inks adhering to the wiping member 502 is not equal to or greater than the first amount, the processing proceeds to S1808. In S1808, the CPU 602 executes the sixth wiping operation in which the wiping is performed after the wiping liquid is applied to the wiping member 502 with the application amount “small” without winding up the wiping member 502. The details of processing of the sixth wiping operation is the same as the fifth wiping operation except that the amount of wiping liquid applied in S1726 is the application amount “small”, which is about 0.05 g in the present embodiment. Further, if it is determined in S1806 that the adhesion amount of the other inks adhering to the wiping member 502 is equal to or greater than the first amount, the processing proceeds to S1810. In S1810, the CPU 602 executes the seventh wiping operation in which the wiping is performed after the wiping liquid is applied to the wiping member 502 with the application amount “large” without winding up the wiping member 502. The details of processing of the seventh wiping operation is the same as the fifth wiping operation except that the amount of wiping liquid applied in S1726 is the application amount “large”, which is about 0.1 g in the present embodiment.

Note that, in the above-described explanation, the ink containing the coloring material that can damage the water-repellent film is regarded as the target ink, and the inks not containing the coloring material are regarded as the other inks, and the application amount of wiping liquid is controlled according to the adhesion amounts of these inks. However, there is not a limitation as such. For example, in a case when the printing apparatus 10 further ejects an ink containing a small amount of the above-described coloring material, the application amount of wiping liquid may be controlled according to the adhesion amounts of these three types of ink.

(11) In the above-described second embodiment, the wiping liquid is applied in a case when the adhesion amount of target ink adhering to the wiping member 502 is equal to or greater than the first amount. However, there is not a limitation as such. The application amount of wiping liquid may be modified in stages according to the adhesion amount of target ink. In this case, the application amount of wiping liquid increases with an increase in the adhesion amount of ink adhering to the wiping member 502.

(12) In the above-described second embodiment, the application of the wiping liquid to the wiping member 502 is controlled based on the adhesion amount of ink adhering to the wiping member 502. However, there is not a limitation as such. For example, as in the above-described modification example (5) of the first embodiment, the application of the wiping liquid to the wiping member 502 may be controlled based on the adhesion amount of ink adhering to the vicinities of the ejection port arrays 302. Alternatively, it is also possible that the application of the wiping liquid to the wiping member 502 is controlled based on the duty or the number of times of ejections of the target ink and the other inks according to the print data subsequent to the most recent wiping operation. That is, the ejection duty, image duty, or number of times of ejections is obtained from the print data, and whether or not the obtained value is equal to or greater than a correspondingly set value is determined, thereby controlling the winding of the wiping member 502. Furthermore, after the most recent wiping operation, whether or not the suction process or the preliminary ejection process has been executed is determined, and, in a case when it is determined that at least one of the processes has been executed, the wiping liquid is applied to the wiping member 502.

(13) Although not particularly described in the second embodiment above, as in the above-described modification example (3) of the first embodiment, the ejection port arrays 302 for the target ink and the ejection port arrays 302 for the other inks may be wiped by different wiping members, respectively. Further, although not specifically described in the second embodiment above, as in the above-described modification example (4) of the first embodiment, the sensor 202 may be installed at any position capable of detecting the concentration of the ink that adhered to the wiping member 502 in the most recent wiping operation. Furthermore, although not particularly described in the second embodiment above, as in the above-described modification example (7) of the first embodiment, the adhesion amount of ink in the area of the wiping member 502 pressed by the pressing member 506 may be detected in the state being pressed by the pressing member 506.

(14) The above-described second embodiment and various forms shown in (9) through (13) may be combined as appropriate.

Third Embodiment

Figure 19:
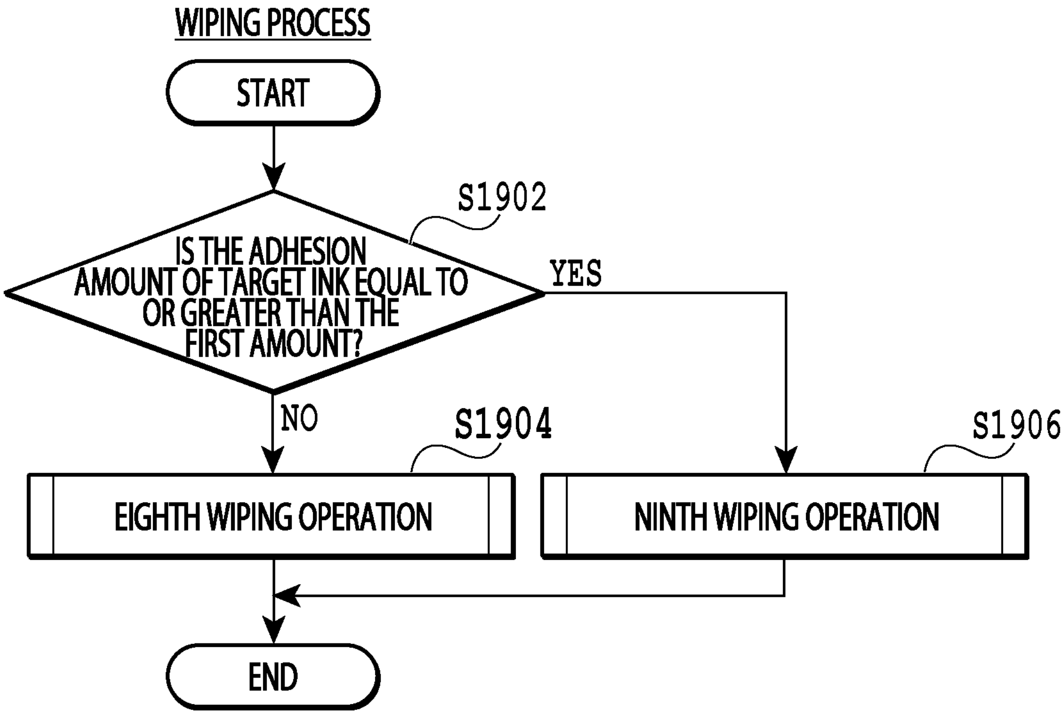
FIG. 19 is a flowchart of a wiping process in the third embodiment.
Figures 20A, 20B:
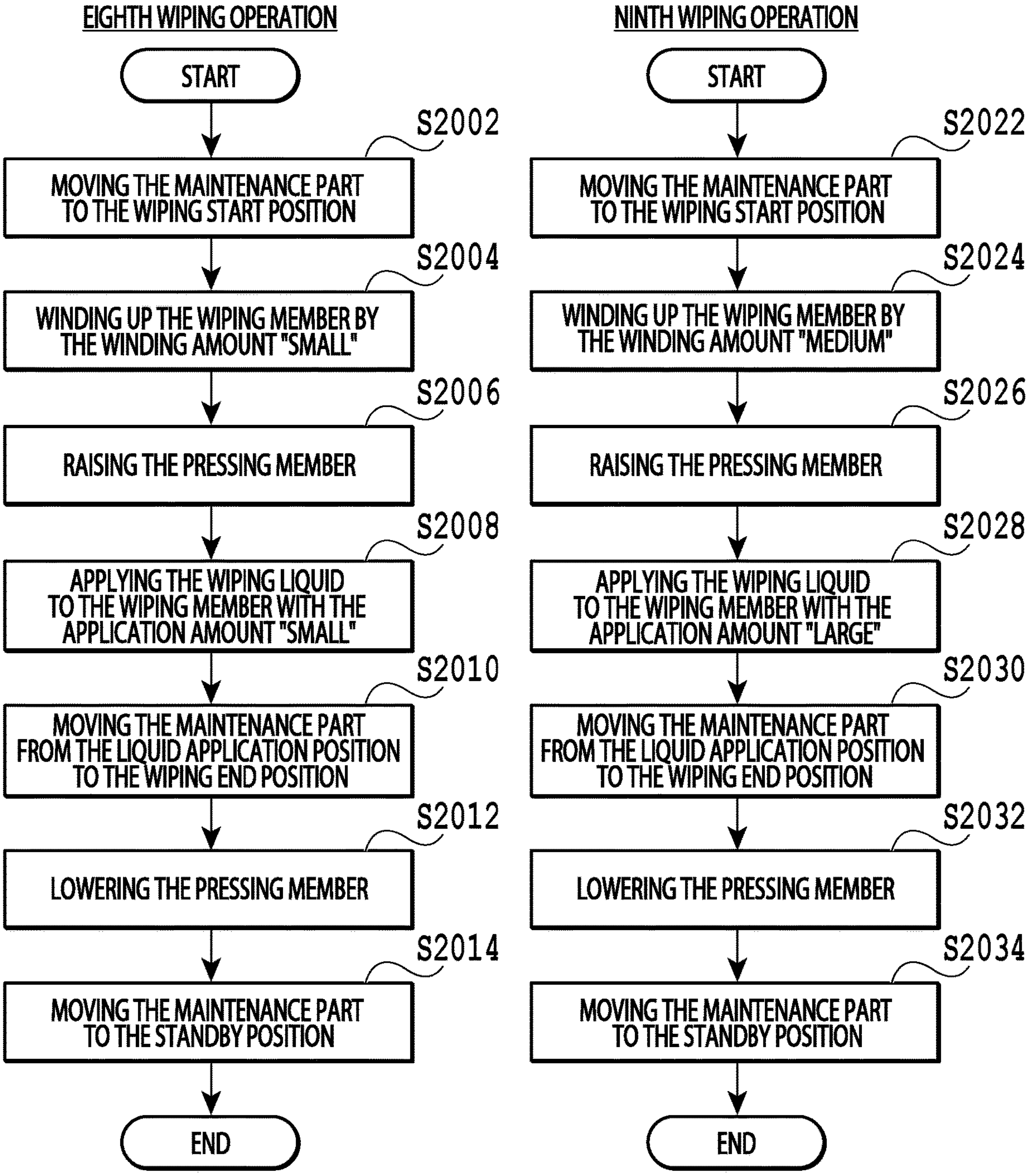
FIG. 20A and FIG. 20B are flowcharts of wiping operations which are subroutines of the wiping process of FIG. 19.

Next, with reference to FIG. 19 to FIG. 20B, an explanation is given of a printing apparatus according to the third embodiment. Note that, in the following explanation, the same or corresponding configurations as those of the above-described first embodiment are assigned with the same signs as those used in the first embodiment, so as to omit the detailed explanations thereof.

The third embodiment differs from the above-described first embodiment and the above-described second embodiment in an aspect that the winding of the wiping member 502 and the application of the wiping liquid to the wiping member 502 are controlled according to the adhesion amount of target ink adhering to the wiping member 502.

<Wiping Process>

Hereafter, an explanation is given of details of processing of the wiping process executed in the printing apparatus 10 according to the present embodiment. FIG. 19 is a flowchart illustrating details of processing of the wiping process executed in the printing apparatus 10 according to the third embodiment. FIG. 20A and FIG. 20B are subroutines of the wiping process of FIG. 19. FIG. 20A is a flowchart illustrating details of processing of the eighth wiping operation, and FIG. 20B is a flowchart illustrating details of processing of the ninth wiping operation. The series of the processes illustrated in these flowcharts are performed by the CPU 602 loading a program code stored in the ROM 604 into the RAM 606 and executing it. Alternatively, a part or all of the functions in the steps of these flowcharts may be executed by hardware such as an ASIC or an electronic circuit.

If the wiping process is started, first, in S1902, the CPU 602 determines whether or not the adhesion amount of target ink adhering to the wiping member 502 is equal to or greater than the first amount. Since the specific details of processing of S1902 are the same as those of S902 described above, the specific details of processing thereof are omitted. If it is determined in S1902 that the adhesion amount of target ink adhering to the wiping member 502 is not equal to or greater than the first amount, the processing proceeds to S1904. In S1904, the CPU 602 executes the eighth wiping operation in which the wiping is performed after winding up the wiping member 502 by the winding amount "small" and applying the wiping liquid to the wiping member 502 with the application amount "small".

If the eighth wiping operation is started, first, in S2002, the CPU 602 moves the maintenance part 28 to the wiping start position, and, in S2004, the CPU 602 drives the rotary member 504*b*, so as to wind up the wiping member 502 by the winding amount "small". In the present embodiment, the winding amount "small" is approximately 2.5 mm. Then, the processing proceeds to S2006, and the CPU 602 raises the pressing member 506 to press the wiping member 502.

Next, the processing proceeds to S2008, and the CPU 602 applies the wiping liquid to the area of the wiping member 502 pressed by the pressing member 506 with the application amount "small". In the present embodiment, the application amount "small" is approximately 0.05 g. Since the specific details of processing of S2008 are the same as those of S1726 described above except for the application amount of the wiping liquid, the specific details of processing thereof are omitted. Then, the processing proceeds to S2010, and the CPU 602 instructs the movement from the liquid application position to the wiping end position. In this process, the deposits such as the ink that has adhered to the ejection port surface 34 are wiped off by the wiping member 502. Here, the area pressed by the pressing member 506 of the wiping member 502 that wipes the ejection port surface 34 includes the portion to which the ink of less than the first amount (including "0") has adhered from the most recent wiping operation. However, the area is partially unused, and a small amount of wiping liquid has been applied. Accordingly, the small amount of ink that has adhered is re-dispersed by the small amount of wiping liquid and permeates to the inside of the wiping member 502, and thus almost no coloring material remains on the surface of the wiping member 502.

After that, the processing proceeds to S2012, and the CPU 602 lowers the pressing member 506 at the wiping end position. After that, the processing proceeds to S2014, and the CPU 602 moves the maintenance part 28 to the standby position while the pressing member 506 is not pressing the wiping member 502, and ends the eighth wiping operation, thereby ending the wiping process.

Further, if it is determined in S1902 that the adhesion amount of target ink adhering to the wiping member 502 is equal to or greater than the first amount, the processing proceeds to S1906. In S1906, the CPU 602 executes the ninth wiping operation in which the wiping is performed after winding up the wiping member 502 by the winding amount "medium" and applying the wiping liquid to the wiping member 502 with the application amount "large".

If the ninth wiping operation is executed, first, in S2022, the CPU 602 moves the maintenance part 28 to the wiping start position, and, in S2024, the CPU 602 winds up the wiping member 502 by the winding amount "medium". In the present embodiment, the winding amount "medium" is approximately 5 mm. Then, the processing proceeds to S2026, and the CPU 602 raises the pressing member 506 to press the wiping member 502.

Next, the processing proceeds to S2028, and the CPU 602 applies the wiping liquid to the area of the wiping member 502 pressed by the pressing member 506 with the application amount "large". In the present embodiment, the application amount "large" is approximately 0.1 g. Since the specific details of processing of S2028 are the same as those of S1726 described above except for the application amount of the wiping liquid, the specific details of processing thereof are omitted. Then, the processing proceeds to S2030, and the CPU 602 instructs the movement from the liquid application position to the wiping end position. In this process, the deposits such as the ink that has adhered to the ejection port surface 34 are wiped off by the wiping member 502.

Here, the area pressed by the pressing member 506 includes a part of the portion to which the ink of the first amount or more has adhered from the most recent wiping operation. However, the area is mostly unused, and a large amount of wiping liquid has been applied. Accordingly, the ink that has remained in the area is re-dispersed by the wiping liquid and permeates to the inside of the wiping member 502, and thus almost no coloring material remains on the surface of the wiping member 502.

After that, the processing proceeds to S2032, and the CPU 602 lowers the pressing member 506 at the wiping end position. After that, the processing proceeds to S2034, and the CPU 602 moves the maintenance part 28 to the standby position while the pressing member 506 is not pressing the wiping member 502, and ends the ninth wiping operation, thereby ending the wiping process.

<Functional Effect>

As explained above, in the present embodiment, the winding of the wiping member 502 and the application of the wiping liquid are controlled according to the adhesion amount of ink containing a coloring material that can damage the water-repellent film formed on the ejection port surface 34 adhering to the wiping member 502 after the most recent wiping of the ejection port surface 34. Specifically, if the adhesion amount of ink adhering to the wiping member 502 in the most recent wiping operation is less than the first amount, the control of the winding of the wiping member 502 and the application of the wiping liquid is executed with low levels before the current wiping operation is executed. That is, the wiping member 502 is wound up by the winding amount "small", and the wiping liquid is applied to the wiping member 502 with the application amount "small". Further, if the adhesion amount of ink adhering to the wiping member in the most recent wiping operation is equal to or greater than the first amount, the control of the winding of the wiping member 502 and the application of the wiping liquid is executed with high levels before the current wiping operation is executed. That is, the wiping member 502 is wound up by the winding amount "medium", and the wiping liquid is applied to the wiping member 502 with the application amount "large". Accordingly, in the current wiping operation, the ejection port surface 34 can be wiped with the area where the amount of coloring material remaining on the surface has been reduced by the wiping liquid, and thus, it is possible to suppress the consumption of the wiping member and suppress deterioration of the ink ejection characteristics.

<Modification Examples of the Third Embodiment>

(15) In the above-described third embodiment, the control levels for the winding of the wiping member 502 and the application of the wiping liquid are set in two stages, i.e., high level and low level. However, there is not a limitation as such. Further, the winding amount and application amount at each level are not limited to those described above. That is, the above-described control levels may be set in three or more stages in which the winding amounts and application amounts are made different, respectively. Further, although not specifically described in the third embodiment, the winding of the wiping member 502 and the application of the wiping liquid may be controlled in consideration of the adhesion amount of the other inks. That is, in the third embodiment, a combination of the following four conditions to suppress damage to the water-repellent film during the wiping operation can be set as appropriate. The four conditions are the adhesion amount of target ink adhering to the wiping member 502, the adhesion amount of the other inks adhering to the wiping member 502, the winding amount of the wiping member 502, and the application amount of wiping liquid to the wiping member 502.

In this case, the adhesion amounts of ink are set in stages according to threshold values based on the ink concentrations measured by the sensor 202. Further, the application amounts of the wiping liquid are set in stages according to the amounts of wiping liquid that can be ejected from the liquid ejection parts 1402. Moreover, the winding amounts of the wiping member are set in stages according to the characteristics of the winding part 504. Furthermore, the control levels are set in stages according to the winding amounts of the wiping member and the application amounts of wiping liquid to the wiping member.

Further, in the above-described explanation, the ink containing the coloring material that can damage the water-repellent film is regarded as the target ink, and the inks not containing the coloring material are regarded as the other inks, and the winding amount of the wiping member and the application amount of the wiping liquid are controlled according to the adhesion amounts of these inks. However, there is not a limitation as such. For example, in a case when the printing apparatus 10 further ejects an ink containing a small amount of the above-described coloring material, the winding amount of the wiping member and the application amount of the wiping liquid may be controlled according to the adhesion amounts of these three types of ink.

(16) In the above-described third embodiment, the application of the wiping liquid to the wiping member 502 is controlled based on the adhesion amount of ink adhering to the wiping member 502. However, there is not a limitation as such. For example, as in the above-described modification example (5) of the first embodiment, the application of the wiping liquid to the wiping member 502 may be controlled based on the adhesion amount of ink adhering to the vicinities of the ejection port arrays 302. Alternatively, it is also possible that the application of the wiping liquid to the wiping member 502 is controlled based on the duty or the number of times of ejections of the target ink and the other inks according to the print data subsequent to the most recent wiping operation. That is, the ejection duty, image duty, or number of times of ejections is obtained from the print data, and whether or not the obtained value is equal to or greater than a correspondingly set value is determined, thereby controlling the winding of the wiping member 502. Furthermore, after the most recent wiping operation, whether or not the suction process or the preliminary ejection process has been executed is determined, and, in a case when it is determined that at least one of the processes has been executed, the wiping liquid is applied to the wiping member 502.

Further, the winding of the wiping member 502 and the application of the wiping liquid to the wiping member 502 may be controlled based on the detection results of both the adhesion amount of ink adhering to the wiping member 502 and the adhesion amount of ink adhering to the vicinities of the ejection port arrays 302. Here, from the adhesion amount of ink adhering to the wiping member 502, whether the area of the wiping member to be used for the wiping that will be executed from now on is suitable for wiping, i.e., whether or not there is a possibility of damaging the water-repellent film, can be determined. Further, from the adhesion amount of ink adhering to the vicinities of the ejection port arrays 302, whether or not the ink on the ejection port surface 34 that will be wiped off can be held by the wiping member 502 without leaving the coloring material of the ink on the surface can be determined.

Therefore, in this case, for example, the winding of the wiping member 502 is controlled based on the adhesion amount of ink adhering to the wiping member 502, and the application of the wiping liquid to the wiping member 502 is controlled based on the adhesion amount of ink adhering to the vicinities of the ejection port arrays 302. For example, in a case when the adhesion amount of ink adhering to the wiping member is equal to or greater than the first amount and the adhesion amount of ink adhering to the ejection port surface is equal to or greater than the first amount, the wiping operation in which the wiping is performed after the wiping member is wound up by the winding amount "large" and the wiping liquid is applied to the wiping member with the application amount "large" is executed. Further, in a case when the adhesion amount of ink adhering to the wiping member is equal to or greater than the first amount and the adhesion amount of ink adhering to the ejection port surface is less than the first amount, the wiping operation in which the wiping is performed after the wiping member is wound up by the winding amount "large" without applying the wiping liquid to the wiping member is executed. Further, in a case when the adhesion amount of ink adhering to the wiping member is less than the first amount and the adhesion amount of ink adhering to the ejection port surface is equal to or greater than the first amount, the wiping operation in which the wiping is performed after the wiping liquid is applied to the wiping member with the application amount "large" without winding up the wiping member is executed. Further, in a case when the adhesion amount of ink adhering to the wiping member is less than the first amount and the adhesion amount of ink adhering to the ejection port surface is less than the first amount, the wiping operation in which the wiping is performed without winding up the wiping member nor applying the wiping liquid to the wiping member is executed.

(17) Although not particularly described in the third embodiment above, as in the above-described modification example (3) of the first embodiment, the ejection port arrays 302 for the target ink and the ejection port arrays 302 for the other inks may be wiped by different wiping members, respectively. Further, although not specifically described in the third embodiment above, as in the above-described modification example (4) of the first embodiment, the sensor 202 may be installed at any position capable of detecting the concentration of the ink that adhered to the wiping member 502 in the most recent wiping operation. Furthermore, although not particularly described in the third embodiment above, as in the above-described modification example (7) of the first embodiment, the adhesion amount of ink in the area of the wiping member 502 pressed by the pressing member 506 may be detected in the state being pressed by the pressing member 506.

(18) The above-described third embodiment and various forms shown in (15) through (17) may be combined as appropriate.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A printing apparatus comprising:

a printing unit configured with an ejection port surface, on which an ejection port array with a plurality of ejection ports that ejects ink being arranged in an array, is formed;

a wiping unit configured with a wiping member for wiping a predetermined area including the ejection port array of the ejection port surface, and configured to wipe the predetermined area by relative movement with the printing unit;

an application unit configured to apply a wiping liquid for re-dispersing the ink; and a control unit configured to control the application unit to apply the wiping liquid to a wiping area that wipes the predetermined area, according to an adhesion amount of ink adhering to the wiping member, wherein the control unit controls the application unit to apply a first amount of the wiping liquid to the wiping area in a case when the adhesion amount is a first adhesion amount, and to apply a second amount, less than the first amount, of the wiping liquid to the wiping area in a case when the adhesion amount is a second adhesion amount, which is less than the first adhesion amount.

2. The printing apparatus according to claim 1, wherein the wiping unit includes a change unit configured to change the wiping area.

3. The printing apparatus according to claim 2, wherein the control unit controls the change unit to change the wiping area in a case when the adhesion amount is a first amount, and not to change the wiping area in a case where the adhesion amount is a second amount, which is less than the first amount.

4. The printing apparatus according to claim 2, wherein the change unit changes the wiping area so that a part of the wiping member that has been positioned in the wiping area before the changing is positioned within the wiping area after the changing.

5. The printing apparatus according to claim 2, wherein, in a case when the adhesion amount is a first adhesion amount, the change unit changes the wiping area by a larger amount compared to a case where the adhesion amount is a second adhesion amount, which is less than the first adhesion amount.

6. The printing apparatus according to claim 2, wherein the change unit changes the wiping area by winding up the wiping member.

7. The printing apparatus according to claim 1, wherein, in the printing unit, a plurality of the ejection port arrays respectively corresponding to a plurality of types of the ink is formed on the ejection port surface, and wherein the control unit controls the application unit to apply the wiping liquid to the wiping area, according to the adhesion amount of a predetermined ink among the plurality of types of the ink.

8. The printing apparatus according to claim 7, wherein the predetermined ink is an ink containing a material that decreases water repellency of the predetermined area.

9. The printing apparatus according to claim 7, wherein the predetermined ink is black ink containing carbon black as a coloring material, white ink containing titanium oxide as a coloring material, or gray ink containing carbon black and titanium oxide as coloring materials.

10. The printing apparatus according to claim 7, wherein the wiping member includes a first wiping member that wipes an area including the ejection port array of the predetermined ink, and a second wiping member that wipes the ejection port array of an ink other than the predetermined ink among the plurality of types of the ink.

11. The printing apparatus according to claim 1, wherein, in the printing unit, a plurality of the ejection port arrays respectively corresponding to a plurality of types of the ink is formed on the ejection port surface, and wherein the control unit controls the application unit to apply the wiping liquid to the wiping area, according to the adhesion amounts of a plurality of inks including a predetermined ink among the plurality of types of the ink.

12. The printing apparatus according to claim 1, wherein, in a case when the adhesion amount is a first adhesion amount, the control unit applies the wiping liquid with a greater application amount compared to a case when the adhesion amount is a second adhesion amount, which is less than the first adhesion amount.

13. A printing apparatus comprising:

a printing unit configured with an ejection port surface, on which an ejection port array with a plurality of ejection ports that ejects ink being arranged in an array, is formed;

a wiping unit configured with a wiping member for wiping a predetermined area including the ejection port array of the ejection port surface, and configured to wipe the predetermined area by relative movement with the printing unit;

an application unit configured to apply a wiping liquid for re-dispersing the ink; and a control unit configured to control the application unit to apply the wiping liquid to wiping area that wipes the predetermined area, according to an adhesion amount of ink adhering to an area including the ejection port array and a vicinity of the ejection port array, wherein the control unit controls the application unit to apply a first amount of the wiping liquid to the wiping area in a case when the adhesion amount is a first adhesion amount, and to apply a second amount, less than the first amount, of the wiping liquid to the wiping area in a case when the adhesion amount is a second adhesion amount, which is less than the first adhesion amount.

14. A printing apparatus comprising:

a printing unit configured with an ejection port surface, on which an ejection port array with a plurality of ejection ports that ejects ink being arranged in an array, is formed, wherein, a plurality of the ejection port arrays respectively corresponding to a plurality of types of the ink is formed on the ejection port surface;

a wiping unit configured with a wiping member for wiping a predetermined area including the ejection port array of the ejection port surface, and configured to wipe the predetermined area by relative movement with the printing unit;

an application unit configured to apply a wiping liquid for re-dispersing the ink; and a control unit configured to control the application unit to apply the wiping liquid to wiping area that wipes the predetermined area, according to a duty or the number of times of ejections based on print data for the ink, wherein the control unit controls the application unit to apply a first amount of the wiping liquid to the wiping area in a case when the adhesion amount is a first adhesion amount, and to apply a second amount, less than the first amount, of the wiping liquid to the wiping area in a case when the adhesion amount is a second adhesion amount, which is less than the first adhesion amount.

15. A printing apparatus comprising:

a printing unit configured with an ejection port surface, on which an ejection port array with a plurality of ejection ports that ejects ink being arranged in an array, is formed;

a wiping unit configured with a wiping member for wiping a predetermined area including the ejection port array of the ejection port surface, and configured to wipe the predetermined area by relative movement with the printing unit;

an application unit configured to apply a wiping liquid for re-dispersing the ink; and a control unit configured to control the application unit to apply the wiping liquid to a wiping area that wipes the predetermined area, according to an adhesion amount of ink adhering to the wiping member, wherein the control unit controls the application unit to apply the wiping liquid to the wiping area, according to the adhesion amount of a predetermined ink among the plurality of types of the ink.

* * * * *